US009049450B2

(12) United States Patent
Hong et al.

(10) Patent No.: US 9,049,450 B2
(45) Date of Patent: Jun. 2, 2015

(54) METHOD AND APPARATUS FOR ENCODING VIDEO BASED ON INTERNAL BIT DEPTH INCREMENT, AND METHOD AND APPARATUS FOR DECODING VIDEO BASED ON INTERNAL BIT DEPTH INCREMENT

(75) Inventors: Yoon-mi Hong, Seoul (KR); Min-su Cheon, Suwon-si (KR); Woo-jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 13/079,890

(22) Filed: Apr. 5, 2011

(65) Prior Publication Data

US 2011/0243219 A1     Oct. 6, 2011

Related U.S. Application Data

(60) Provisional application No. 61/320,826, filed on Apr. 5, 2010.

(30) Foreign Application Priority Data

Jul. 7, 2010   (KR) .................. 10-2010-0065469

(51) Int. Cl.
  *H04N 7/26*    (2006.01)
  *H04N 19/36*   (2014.01)
  (Continued)

(52) U.S. Cl.
  CPC ............ *H04N 19/36* (2013.01); *H04N 19/176* (2013.01); *H04N 19/119* (2013.01); *H04N 19/46* (2013.01); *H04N 19/96* (2013.01); *H04N 19/124* (2013.01); *H04N 19/184* (2013.01); *H04N 19/34* (2013.01)

(58) Field of Classification Search
  CPC .......................................... G06K 9/36
  USPC ..................... 375/240.02; 382/238
  See application file for complete search history.

(56) References Cited

U.S. PATENT DOCUMENTS

| 5,367,629 A | 11/1994 | Chu et al. |
| 6,195,465 B1 | 2/2001 | Zandi et al. |
| (Continued) | | |

FOREIGN PATENT DOCUMENTS

| CN | 1698386 A | 11/2005 |
| JP | 8251590 A | 9/1996 |

(Continued)

OTHER PUBLICATIONS

Schwarz et al "Overview of SVC", IEEE Trans Cir Sys for Vid Tech, Sep. 2007.*

(Continued)

*Primary Examiner* — Jay Patel
*Assistant Examiner* — Frank Huang
(74) *Attorney, Agent, or Firm* — Sughrue Mion, PLLC

(57) ABSTRACT

A method of encoding a video based on a bit depth increment, the method including: determining a scaling method so that a dynamic range, which is based on a bit depth of a restored image decreased by de-scaling that is performed to decrease the bit depth increment, is identical to a dynamic range based on a bit depth of an input image, and generating an internal image having the bit depth increment by applying the scaling method to pixel values of the input image; and determining and encoding coding units having a tree structure, for each maximum coding unit of the internal image having the bit depth increment.

44 Claims, 15 Drawing Sheets

(51) Int. Cl.

| | | |
|---|---|---|
| H04N 19/176 | (2014.01) | |
| H04N 19/119 | (2014.01) | |
| H04N 19/46 | (2014.01) | |
| H04N 19/96 | (2014.01) | |
| H04N 19/124 | (2014.01) | |
| H04N 19/184 | (2014.01) | |
| H04N 19/34 | (2014.01) | |

(56) References Cited

U.S. PATENT DOCUMENTS

| | | | |
|---|---|---|---|
| 7,181,072 B2 | 2/2007 | Wang et al. | |
| 7,262,721 B2 | 8/2007 | Jeon et al. | |
| 7,460,041 B2 | 12/2008 | Yang et al. | |
| 7,512,179 B2* | 3/2009 | Sanson et al. | 375/240.12 |
| 7,577,305 B2 | 8/2009 | Srinivasan | |
| 2003/0016745 A1 | 1/2003 | Park et al. | |
| 2003/0128753 A1 | 7/2003 | Lee et al. | |
| 2003/0215014 A1 | 11/2003 | Koto et al. | |
| 2005/0008231 A1 | 1/2005 | Christopoulos et al. | |
| 2005/0041740 A1 | 2/2005 | Sekiguchi et al. | |
| 2005/0084013 A1 | 4/2005 | Wang et al. | |
| 2005/0114093 A1 | 5/2005 | Cha et al. | |
| 2005/0123207 A1 | 6/2005 | Marpe et al. | |
| 2005/0147169 A1 | 7/2005 | Wang et al. | |
| 2005/0244068 A1 | 11/2005 | Nakachi et al. | |
| 2006/0146936 A1 | 7/2006 | Srinivasan | |
| 2006/0251330 A1 | 11/2006 | Toth et al. | |
| 2006/0262978 A1 | 11/2006 | Wang et al. | |
| 2007/0009047 A1 | 1/2007 | Shim et al. | |
| 2007/0098078 A1 | 5/2007 | Kim et al. | |
| 2007/0248163 A1 | 10/2007 | Zuo et al. | |
| 2008/0055614 A1 | 3/2008 | Qiao et al. | |
| 2008/0069235 A1 | 3/2008 | Abe et al. | |
| 2008/0170793 A1 | 7/2008 | Yamada et al. | |
| 2008/0232706 A1 | 9/2008 | Lee et al. | |
| 2008/0310745 A1 | 12/2008 | Ye et al. | |
| 2009/0003716 A1 | 1/2009 | Sekiguchi et al. | |
| 2009/0080534 A1 | 3/2009 | Sekiguchi et al. | |
| 2009/0087110 A1 | 4/2009 | Tourapis et al. | |
| 2009/0087111 A1* | 4/2009 | Noda et al. | 382/238 |
| 2009/0232207 A1 | 9/2009 | Chen | |
| 2009/0245668 A1 | 10/2009 | Fukuhara et al. | |
| 2010/0040148 A1 | 2/2010 | Marpe et al. | |
| 2013/0343452 A1 | 12/2013 | Jeong et al. | |

FOREIGN PATENT DOCUMENTS

| | | |
|---|---|---|
| JP | 11164305 A | 6/1999 |
| JP | 2001145106 A | 5/2001 |
| JP | 2003179499 A | 6/2003 |
| JP | 2003230149 A | 8/2003 |
| JP | 2005513883 A | 5/2005 |
| JP | 2006211304 A | 8/2006 |
| JP | 2007174569 A | 7/2007 |
| JP | 2008527902 A | 7/2008 |
| JP | 2009504039 A | 1/2009 |
| KR | 20030009669 A | 2/2003 |
| KR | 1020040105872 A | 12/2004 |
| KR | 1020050045746 A | 5/2005 |
| KR | 1020050061396 A | 6/2005 |
| KR | 1020060027795 A | 3/2006 |
| KR | 1020070047523 A | 5/2007 |
| KR | 100842558 B1 | 6/2008 |
| RU | 2 273 112 C2 | 3/2006 |
| RU | 2 334 973 C1 | 9/2008 |
| RU | 2 335 845 C2 | 10/2008 |
| WO | 2008/020672 A1 | 2/2008 |
| WO | 2011/126277 A3 | 10/2011 |
| WO | 2011/126282 A3 | 10/2011 |

OTHER PUBLICATIONS http://web.archive.org/web/20090110172149/http://en.wikipedia.org/wiki/Quadtree, accessed Jan. 2009.*

International Search Report dated Dec. 15, 2011 in counterpart international application No. PCT/KR2011/002386.
International Search Report dated Dec. 19, 2011 in counterpart international application No. PCT/KR2011/002389.
International Search Report dated Dec. 22, 2011 in counterpart international application No. PCT/KR2011/002383.
International Search Report dated Nov. 23, 2011 in counterpart international application No. PCT/KR2011/002384.
International Search Report dated Nov. 28, 2011 in counterpart international application No. PCT/KR2011/002377.
Notification of Transmittal of the International Search Report and the Written Opinion of the International Searching Authority dated Dec. 15, 2011 in counterpart international application No. PCT/KR2011/002386.
Notification of Transmittal of the International Search Report and the Written Opinion of the International Searching Authority dated Dec. 19, 2011 in counterpart international application No. PCT/KR2011/002389.
Notification of Transmittal of the International Search Report and the Written Opinion of the International Searching Authority dated Dec. 22, 2011 in counterpart international application No. PCT/KR2011/002383.
Notification of Transmittal of the International Search Report and the Written Opinion of the International Searching Authority dated Nov. 23, 2011 in counterpart international application No. PCT/KR2011/002384.
Notification of Transmittal of the International Search Report and the Written Opinion of the International Searching Authority dated Nov. 28, 2011 in counterpart international application No. PCT/KR2011/002377.
Written Opinion of the International Searching Authority dated Dec. 15, 2011 in counterpart international application No. PCT/KR2011/002386.
Written Opinion of the International Searching Authority dated Dec. 19, 2011 in counterpart international application No. PCT/KR2011/002389.
Written Opinion of the International Searching Authority dated Dec. 22, 2011 in counterpart international application No. PCT/KR2011/002383.
Written Opinion of the International Searching Authority dated Nov. 23, 2011 in counterpart international application No. PCT/KR2011/002384.
Written Opinion of the International Searching Authority dated Nov. 28, 2011 in counterpart international application No. PCT/KR2011/002377.
Communication dated Dec. 9, 2013 issued by the Russian Patent Office in counterpart Russian Patent Application No. 2012146753.
Communication dated Jan. 22, 2014 issued by the Russian Patent Office in counterpart Russian Patent Application No. 2012146749.
Communication, dated Sep. 3, 2013, issued by the Australian Patent Office in counterpart Australian Application No. 2011239059.
Communication, dated Sep. 3, 2013, issued by the Australian Patent Office in counterpart Australian Application No. 2011239137.
Communication from the Malaysian Patent Office issued May 15, 2014 in a counterpart Malaysian Application No. PI 2012004422.
Communication from the Malaysian Patent Office issued May 15, 2014 in a counterpart Malaysian Application No. PI 2012004418.
Communication from the Russian Patent Office dated Jul. 28, 2014, in a counterpart Russian application No. 2012146749/08(075112).
Communication from the Australian Patent Office issued Sep. 22, 2014 in a counterpart Australian Application No. 2011239059.
Woo-Jin Han, et al., "Improved Video Compression Efficiency Through Flexible Unit Representation and Corresponding Extension of Coding Tools", IEEE Trans. on CSVT. Dec. 2010, vol. 20, No. 12, pp. 1709-1720.
S. Naito, et al., "Efficient coding scheme for super high definition video based on extending H.264 high profile", Visual Communications and Image Processing 2007. Jan. 2006, SPIE-IS&T/vol. 6077, pp. 1-8.
Siwei Ma, et al., "High-definition Video Coding with Super-macroblocks", Visual Communications and Image Processing 2007. Jan. 2007, SPIE-IS&T/vol. 6508, pp. 1-12.

(56) References Cited

OTHER PUBLICATIONS

Ken McCann, et al. "Samsung's Response to the Call for Proposals on Video Compression Technology", JCT-VC OF ITU-T SG16 WP3 and ISO/IEC JTC1/SC29/WG11, 1st Meeting. JCTVC-A124. Apr. 15-23, 2010, pp. 1-42.

Communication from the Korean Intellectual Property Office dated Dec. 11, 2014, in a counterpart Korean application No. 10-2010-0096920.

Communication from the Canadian Patent Office issued Oct. 17, 2014, in a counterpart Canadian Application No. 2795621.

Communication dated Feb. 3, 2015, issued by the Japanese Intellectual Property Office in counterpart Japanese Application No. 2013-503673.

Nakano et al., "A Method of Stream Base Fast Image Retrieval for JPEG Coded Images", ITE Technical Report 2005, vol. 29, No. 17, Feb. 26, 2005, pp. 21-24, ISSN 1342-6893.

Communication dated Feb. 3, 2015, issued by the Japanese Intellectual Property Office in counterpart Japanese Application No. 2013-503671.

Y. B. Yu, et.al., "Low Bit Rate Video Coding Using Variable Block Size Model", Proc. of 1990 Int. Conf. on Acoustics, Speech, and Signal Processing (ICASSP-90), vol. 4, Apr. 1990, pp. 2229-2232, ISSN:1520-6149.

Martin, G.R., et.al., "Reduced entropy motion compensation using variable sized blocks", Proceedings of SPIE, vol. 3024, Jan. 10, 1997, pp. 293-302, ISSN:0277-786X.

Cheng-Tie Chen, "Adaptive Transform Coding Via Quadtree-Based Variable Blocksize DCT", Proc. of 1989 Int. Conf. on Acoustics, Speech, and Signal Processing (ICASSP-89), vol. 3, May 1989, pp. 1854-1857, ISSN:1520-6149.

Yamamoto, T., et.al., "Further result on constraining transform candidate in Extended Block Sizes", [online], Jul. 7, 2009, ITU—Telecommunications Standardization Sector Study Group 16 Question 6 Video Coding Experts Group (VCEG), Document: VCEG-AL19, URL:http://wftp3.itu.int/av-arch/video-site/0906_LG/VCEG-AL19.zip.

Communication dated Feb. 2, 2015, issued by the Ministry of Justice and Human Rights of the Republic of Indonesia Directorate General of Intellectual Property Rights in counterpart Indonesian Application No. W-00201204527.

Communication dated Feb. 28, 2015, issued by the State Intellectual Property Office of P.R. China in counterpart Chinese Application No. 201180027746.6.

Communication dated Mar. 23, 2015, issued by the State Intellectual Property Office of P.R. China in counterpart Chinese Application No. 201180027751.7.

\* cited by examiner

FIG. 7
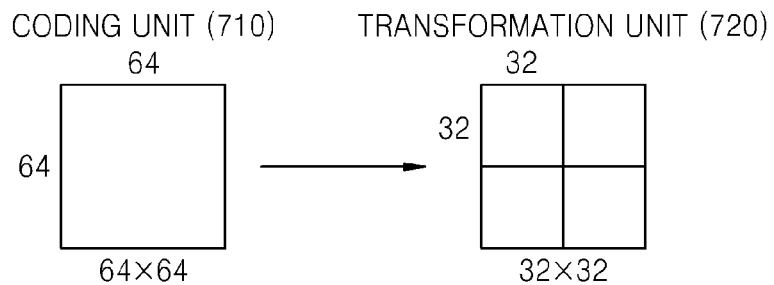
FIG. 8
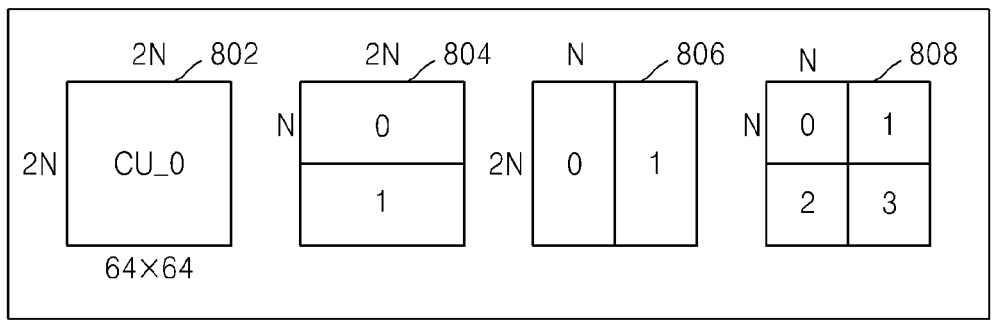
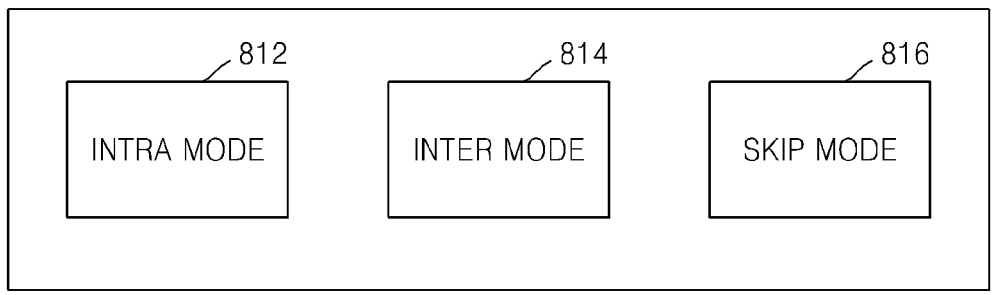
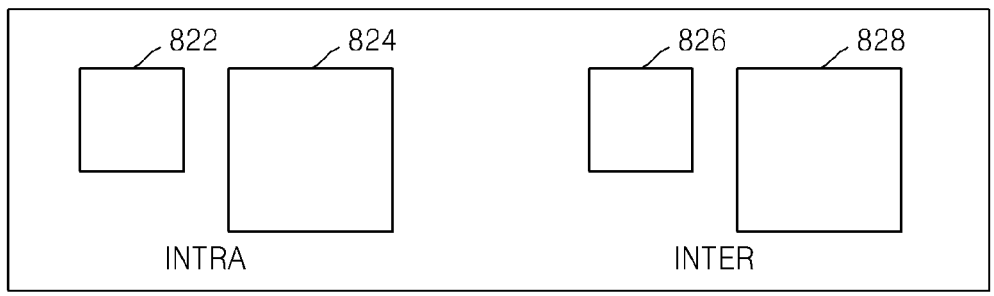

CODING UNITS (1010)

METHOD AND APPARATUS FOR ENCODING VIDEO BASED ON INTERNAL BIT DEPTH INCREMENT, AND METHOD AND APPARATUS FOR DECODING VIDEO BASED ON INTERNAL BIT DEPTH INCREMENT

CROSS-REFERENCE TO RELATED APPLICATIONS

This application claims the benefit of Korean Patent Application No. 10-2010-0065469, filed on Jul. 7, 2010, in the Korean Intellectual Property Office, and U.S. Provisional Patent Application No. 61/320,826, filed on Apr. 5, 2010, in the United State Patent and Trademark Office, the disclosures of which are incorporated herein in their entireties by reference.

BACKGROUND

1. Field

The exemplary embodiments relate to encoding and decoding a video.

2. Description of the Related Art

As hardware for reproducing and storing high resolution or high quality video content is being developed and supplied, there is increasing need for a video codec for effectively encoding or decoding the high resolution or high quality video content. In a conventional video codec, a video is encoded according to a limited encoding method based on a macroblock having a predetermined size.

If a dynamic range of an image increases, presentation of detailed information can be improved. Thus, the video codec uses encoding and decoding methods by using an internal image having an increased dynamic range in order to enhance accuracy of prediction encoding.

SUMMARY

The exemplary embodiments provide encoding and decoding of video based on a bit depth increment.

According to an aspect of the exemplary embodiments, there is provided a method of encoding a video based on a bit depth increment, the method including: determining a scaling method so that a dynamic range, which is based on a bit depth of a restored image decreased by de-scaling that is performed to decrease the bit depth increment, is identical to a dynamic range based on a bit depth of an input image in order to correspond to a scaling method performed to increase the bit depth of the input image, and generating an internal image having the bit depth increment by applying the scaling method to pixel values of the input image; and determining coding units having a tree structure including coding units of coding depths that are hierarchical according to depths in the same region of a maximum coding unit and are independent in different regions by independently determining the coding units of the coding depths to output an encoding result for each deeper coding unit, among hierarchically deeper coding units according to a depth indicating a number of times the coding unit is spatially split from the maximum coding unit, for each maximum coding unit split in a data unit of a maximum size to encode the internal image having the bit depth increment.

A first minimum value of the dynamic range based on the bit depth of the input image is 0, and a first maximum value thereof may be obtained by subtracting 1 from a value obtained by raising 2 to the power of the bit depth of the input image.

The first scaling method may left-shift a bit stream of the pixel values of the input image by the bit increment. A second minimum value of a dynamic range of the internal image may be 0, and a second maximum value thereof may be obtained by left-shifting a bit stream of the first maximum value by a bit increment according to the first scaling method.

The second scaling method may multiply a dynamic range of the internal image by the pixel values of the input image and divides the multiplied value by a dynamic range of the input image. A third minimum value of the dynamic range of the internal image may be 0, and a third maximum value thereof may be obtained by subtracting 1 from a value obtained by raising 2 to the power of a sum of a bit increment according to the second scaling method and the bit depth of the input image.

The third scaling method may increase a bit depth of a value obtained by summing the pixel values of the input image and 1 by the bit increment. A fourth minimum value of the dynamic range of the internal image may be obtained by subtracting 1 from a value obtained by raising 2 to the power of a bit increment according to the scaling method, and a fourth maximum value thereof may be obtained by subtracting 1 from a value obtained by raising 2 to the power of a sum of a bit increment according to the third scaling method and the bit depth of the input image.

The fourth scaling method may sum a value obtained by increasing the bit depth of the input image by the bit increment and a maximum integral number smaller than or equal to a value obtained by decreasing the bit depth of the input image by a difference between the bit depth of the input image and the bit increment. A minimum value of the dynamic range of the internal image may be 0, and a maximum value thereof may be obtained by subtracting 1 from a value obtained by raising 2 to the power of a sum of a bit increment according to the fourth scaling method and the bit depth of the input image.

The method may further include: encoding information about the bit depth increment and transmitting the encoded information along with encoding data of a picture and encoding mode information about the coding units having the tree structure of the maximum coding unit.

According to another aspect of the exemplary embodiments, there is provided a method of decoding a video based on a bit depth increment, the method including: parsing a received bit stream and extracting image data encoded for each coding unit, encoding mode information about coding units having a tree structure, and information about the bit depth increment according to the coding units having the tree structure including each maximum coding unit from among maximum coding units split from a current image from the parsed bit stream; decoding the image data encoded for each coding unit and restoring an internal image based on the extracted encoding mode information about coding units having the tree structure for each maximum coding unit; and determining a de-scaling method corresponding to a scaling method that increases a bit depth of an original, or input, image, and generating a restored image by applying the de-scaling method to pixel values of the internal image and decreasing a bit depth of the internal image, wherein a dynamic range based on a bit depth of the restored image having a restored bit depth according to the de-scaling method is identical to a dynamic range based on the bit depth of the original image.

The restoring of the bit depth may comprise receiving the internal image having an increased bit depth according to the first scaling method. In this case, the first de-scaling method corresponding to the first scaling method may right-shift, by the bit increment, a bit stream of a value obtained by summing the pixel values of the internal image and an error between the second maximum value and a maximum value of a dynamic range increased based on a bit depth obtained by summing the bit depth of the input image and the bit increment. The error between the second maximum and the maximum value of the dynamic range may be a value obtained by left-shifting a bit stream of 1 by a value obtained by subtracting 1 from the bit increment.

The restoring of the bit depth may comprise receiving the internal image having an increased bit depth according to the second scaling method. In this case, the second de-scaling method corresponding to the second scaling method may multiply pixel values of the restored image by the dynamic range of the input image and divides the multiplied value by the dynamic range of the internal image.

The restoring of the bit depth may comprise receiving the internal image having an increased bit depth according to the third scaling method. In this case, the third de-scaling method corresponding to the third scaling method may decrease a bit depth of a value obtained by summing the pixel values of the internal image and 1 by the bit increment. The third de-scaling method may subtract 1 from a value obtained by right-shifting, by the bit increment, a bit stream of the value obtained by summing the pixel values of the internal image and 1.

The restoring of the bit depth may comprise receiving the internal image having an increased bit depth according to the fourth scaling method. In this case, the fourth de-scaling method corresponding to the scaling method may decrease, by the bit increment, a bit depth of a value obtained by subtracting, from the pixel values of the internal image, a maximum integral number smaller than or equal to a value obtained by decreasing a bit depth of the pixel values of the internal image by the bit depth of the input image. The fourth de-scaling method may right-shift, by the bit increment, a bit stream of a value obtained by subtracting, from the pixel values of the internal image, a maximum integral number smaller than or equal to a value obtained by right-shifting the bit stream of the pixel values of the internal image by the bit increment.

According to another aspect of an exemplary embodiment, there is provided an apparatus for encoding a video based on a bit depth increment, the apparatus including: a bit depth increment unit for determining a scaling method and a de-scaling method so that a dynamic range, which is based on a bit depth of a restored image decreased by de-scaling that is performed to decrease the bit depth increment, is identical to a dynamic range based on a bit depth of an input image in order to correspond to a scaling method performed to increase the bit depth of the input image, and generating an internal image having the bit depth increment by applying the scaling method to pixel values of the input image; an encoding unit for determining coding units having a tree structure including coding units of coding depths that are hierarchical according to depths in the same region of a maximum coding unit and are independent in different regions by independently determining the coding units of the coding depths to output an encoding result for each deeper coding unit, among hierarchically deeper coding units according to a depth indicating a number of times the coding unit is spatially split from the maximum coding unit, for each maximum coding unit split in a data unit of a maximum size to encode the internal image having the bit depth increment; and a transmission unit for encoding information about the bit depth increment and transmitting the encoded information along with encoding data of a picture and encoding mode information about the coding units having the tree structure of the maximum coding unit.

According to another aspect of an exemplary embodiment, there is provided an apparatus for decoding a video based on a bit depth increment, the apparatus including: a receiver and extractor for parsing a received bit stream and extracting image data encoded for each coding unit, encoding mode information about coding units having a tree structure, and information about the bit depth increment according to the coding units having the tree structure including each maximum coding unit from among maximum coding units split from a current image from the parsed bit stream; a decoding unit for decoding the image data encoded for each coding unit and restoring an internal image based on the extracted encoding mode information about coding units having the tree structure for each maximum coding unit; and a bit depth restoring unit for determining a de-scaling method corresponding to a scaling method that increases a bit depth of an original image, and generating a restored image by applying the de-scaling method to pixel values of the internal image and decreasing a bit depth of the internal image, wherein a dynamic range based on a bit depth of the restored image having a restored bit depth according to the de-scaling method is identical to a dynamic range based on the bit depth of the original image.

According to another aspect of an exemplary embodiment, there is provided a computer readable recording medium having recorded thereon a program for executing the method of encoding a video based on a bit depth increment.

According to another aspect of an exemplary embodiment, there is provided a computer readable recording medium having recorded thereon a program for executing the method of decoding a video based on a bit depth increment.

BRIEF DESCRIPTION OF THE DRAWINGS

The above and other features of the exemplary embodiment will become more apparent by describing in detail exemplary embodiments thereof with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION

Hereinafter, the exemplary embodiments will be described more fully with reference to the accompanying drawings, in which exemplary embodiments are shown. In the exemplary embodiments, "unit" may or may not refer to a unit of size, depending on its context.

Hereinafter, a 'coding unit' is an encoding data unit in which the image data is encoded at an encoder side and an encoded data unit in which the encoded image data is decoded at a decoder side, according to exemplary embodiments. Also, a 'coded depth' means a depth where a coding unit is encoded.

Hereinafter, an 'image' may denote a still image for a video or a moving image, that is, the video itself.

Figure 1:
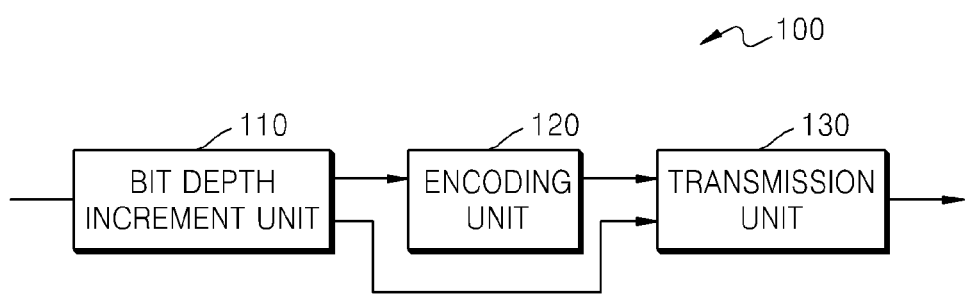
FIG. 1 is a block diagram of an apparatus for encoding a video based on a bit depth increment, according to an exemplary embodiment.

FIG. 1 is a block diagram of a video encoding apparatus 100 based on a bit depth increment, according to an exemplary embodiment.

The video encoding apparatus 100 based on the bit depth increment (hereinafter, referred to as the "video encoding apparatus 100") includes a bit depth increment unit 110, an encoding unit 120, and a transmission unit 130.

A bit depth of a pixel value of an image may increase through scaling and decrease through de-scaling. A dynamic range of the image may be determined according to the bit depth of the pixel value of the image. An increment of the bit depth of the image or a decrement thereof may involve an increment of the dynamic range of the image or a decrement thereof.

The bit depth increment unit 110 generates an internal image in which a bit depth of an input image increases by applying a scaling method to pixel values of the input image. The bit depth increment unit 110 may select the scaling method that increases the bit depth. In accordance with the scaling method determined by the bit depth increment unit 110 and a de-scaling method corresponding to the determined scaling method, a dynamic range of a restored image in which the bit depth decreases through de-scaling may correspond to a dynamic range of the input image.

In accordance with the scaling method for the bit depth increment of the present embodiment, encoding and decoding may be performed by using a dynamic range as fully as possible based on a bit depth increment. In accordance with the de-scaling method corresponding to the scaling method, a bit depth of the restored image may be decreased, and the dynamic range of the restored image based on the bit depth decrement may be restored to correspond to a dynamic range of an original image based on a bit depth, without having to perform a clipping process. The scaling method may be determined in a predetermined data unit, such as a sequence, a picture, a frame field, a maximum coding unit, and the like, and thus the same scaling method may be used for the same data unit, and different scaling methods may be used for different data units.

The scaling method for the bit depth increment may be realized in various ways. Four scaling methods are described below.

For convenience of description, a minimum value of the dynamic range based on the bit depth of the input image, i.e. the original image, is 0, and a maximum value thereof is obtained by subtracting 1 from a value obtained by raising 2 to the power of the bit depth of the input image. The dynamic range of the image may be defined in a range between the minimum value and the maximum value.

The bit depth increment unit 110 according to a first scaling method may generate the internal image by performing an operation that left-shifts bit streams of pixel values of the input image by a bit increment. In accordance with the first scaling method, a minimum value of the dynamic range of the input image based on the increased bit depth through the first scaling may be 0, and a maximum value thereof may be obtained by multiplying the maximum value of the dynamic range of the input image by a value obtained by raising 2 to the power of the bit increment according to the bit depth increment. That is, the maximum value of the dynamic range of the input image based on the increased bit depth by using the first scaling method may be obtained by left-shifting a bit stream of a first maximum value by the bit increment.

A first de-scaling method corresponding to the first scaling method may be applied to the internal image restored by decoding encoded data of the internal image. The first de-scaling method compensates for an error, between the maximum value of the dynamic range increased based on a bit depth obtained by summing the bit increment and the bit depth of the input image and the maximum value of the dynamic range increased by using the first scaling method, with respect to pixel values of the internal image, and increases the bit depth. That is, a bit operation according to the first de-scaling method right-shifts, by the bit increment, a bit stream of a value obtained by summing an error between a maximum value of an ideal dynamic range increased based on the increased bit depth and a maximum value of a real dynamic range increased by using the first scaling method and pixel values of the internal image. An error between the ideal dynamic range and the real dynamic range may be a value obtained by left-shifting a bit stream of 1 by a value obtained by subtracting 1 from the bit increment.

A second scaling method follows an operation that multiplies pixel values of the input image by the dynamic range based on the increased bit depth and divides the multiplied value by the dynamic range of the input image so that the minimum value and the maximum value of the input image correspond respectively to the minimum value and the maximum value of the dynamic range according to the bit depth increment according to a linear function. That is, the bit depth increment unit 110 according to the second scaling method may perform an operation that divides, by the dynamic range of the input image, a value obtained by subtracting pixel values of the input image from a value obtained by left-shifting bit streams of pixel values of the input image by a sum of the bit depth of the input image and the bit increment. In accordance with the second scaling method, a minimum value of the dynamic range of the input image based on the increased bit depth through the second scaling may be 0, and a maximum value thereof may be obtained by subtracting 1 from a value obtained by raising 2 to the power of the sum of the bit depth of the input image and the bit increment.

A second de-scaling method corresponding to the second scaling method follows an operation that multiplies the dynamic range of the input image by pixel values of the internal image and divides the dynamic range based on the increased bit depth. That is, the second de-scaling method follows an operation that divides, by the dynamic range based on the increased bit depth, a value obtained by subtracting pixel values of the internal image from a value obtained by left-shifting bit streams of pixel values of the internal image by the bit depth of the input image.

A third scaling method follows an operation that increases, by the bit increment, a bit depth of a value obtained by summing 1 and pixel values of the input image. That is, the bit depth increment unit 110 according to the third scaling method may perform an operation that subtracts 1 from a value obtained by left-shifting, by the bit increment, bit streams of values obtained by summing 1 and pixel values of the input image. In accordance with the third scaling method, a minimum value of the dynamic range of the input image based on the increased bit depth through the third scaling may be obtained by subtracting 1 from a value obtained by raising 2 to the power of the bit increment, and a maximum value thereof may be obtained by subtracting 1 from a value obtained by raising 2 to the power of the sum of the bit depth of the input image and the bit increment.

In accordance with a third de-scaling method corresponding to the third scaling method, bit depths of values obtained by summing 1 and pixel values of the internal image are decreased by the bit increment. That is, the third de-scaling method may follow an operation that subtracts 1 from a value obtained by right-shifting, by the bit increment, bit streams of values obtained by summing 1 and pixel values of the internal image.

A fourth scaling method may follow an operation that sums a value obtained by increasing the bit depth of the input image by the bit increment and a maximum integral number that is smaller than or is equal to a value obtained by decreasing the bit depth of the input image by the bit increment. That is, the bit depth increment unit 110 according to the fourth scaling method may perform an operation that sums a value obtained by left-shifting, by a difference value between the bit depth of the input image and the bit increment, bit streams of pixel values of the input image and a maximum integral number that is smaller than or is equal to a value obtained by right-shifting, by the bit increment, bit streams of pixel values of the input image. In accordance with the fourth scaling method, the dynamic range of the input image based on the bit depth increased through the fourth scaling may be the same as the dynamic range of the input image increased through the second scaling as described above.

A fourth de-scaling method corresponding to the fourth scaling method follows an operation that decreases, by the bit increment, a bit depth obtained by subtracting a maximum integral number that is smaller than or is equal to a value obtained by decreasing bit depths of pixel values of the internal image by the bit depth of the input image, from pixel values of the internal image. That is, the fourth de-scaling method may perform a bit operation that right-shifts, by the bit increment, bit streams of values obtained by subtracting, from pixel values of the internal image, a maximum integral number that is smaller than or is equal to a value obtained by right-shifting bit depths of pixel values of the internal image by the bit depth of the input image.

The dynamic range of the internal image having the increased bit depth through scaling, including the first through fourth scaling methods, may be used at the maximum. In accordance with a scaling method determined in order for the dynamic range of the restored image according to de-scaling to correspond to the dynamic range of the input image, the bit depth increment unit 110 may output data of the increased bit depth.

The encoding unit 120 encodes the internal image having the bit depth increased by the bit depth increment unit 110. The encoding unit 120 receives the internal image and splits the received internal image in a maximum coding unit. The maximum coding unit according to an exemplary embodiment may be a data unit having a size of 32×32, 64×64, 128×128, 256×256, etc., wherein a shape of the data unit is greater than 8 and a square having a width and height in squares of 2.

The encoding unit 120 determines coding units having a hierarchical tree structure in each spatially split region for each maximum coding unit. The coding units having a tree structure of the maximum coding unit is expressed based on a depth indicating a number of times the coding unit is split from the maximum coding unit. The coding units having the tree structure include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions.

The encoding unit 120 may encode each of deeper coding units included in a current maximum coding unit, compare encoding results regarding the coding units corresponding to upper depths and lower depths for each region, and determine the coding unit that outputs the optimal encoding result and an encoding depth that is a current depth. Furthermore, the encoding depth for a current region may be independently determined from encoding depths for different regions.

Therefore, the coding unit 120 may determine the coding units having the tree structure including the coding units corresponding to the encoding depths independently determined in each region for each maximum coding unit. The encoding unit 120 performs prediction encoding during a process of determining the coding units corresponding to the encoding depths. The encoding unit 120 may determine a prediction unit or a partition that is a data unit used to perform prediction encoding to output the optimal encoding result in the coding unit of the coding depth.

For example, a partition type of a coding unit of 2N×2N may include partitions of 2N×2N, 2N×N, N×2N, and N×N. Examples of a partition type include symmetrical partitions that are obtained by symmetrically splitting a height or width of the coding unit, partitions obtained by asymmetrically splitting the height or width of the coding unit, such as 1:n or n:1, partitions that are obtained by geometrically splitting the prediction unit, and partitions having arbitrary shapes. A prediction mode of the partition type may include an intra mode, a inter mode, and a skip mode.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The encoding unit 120 encodes at least one split region obtained by splitting a region of the maximum coding unit according to depths, and determines a depth to output a finally encoded image data according to the at least one split region. In other words, the encoding unit 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the encoding unit 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A maximum depth according to an exemplary embodiment may denote the total number of splitting times from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the maximum depth may be set to 4.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into $4^1$ transformation units, and the size of the transformation unit is thus N×N, and may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the encoding unit 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 13.

The encoding unit 120 may measure an encoding error of deeper coding units according to depths by using Rate-Distortion Optimization based on Lagrangian multipliers.

The transmission unit 130 may encode information about the bit depth increment determined by the bit depth increment unit 110 and transmit the encoded information along with encoded data of a picture output from the encoding unit 120 and encoding mode information about the coding units of the tree structure of the maximum coding unit. The information about the bit depth increment may include information such as a used scaling method, the bit increment, etc.

The transmission unit 130 may transmit the information about the bit depth increment, the encoded data, and the encoding mode information about the coding units, for each maximum coding unit of the picture. The transmission unit 130 may insert the information about the bit depth increment into a sequence parameter set (SPS) or a picture parameter set (PPS) of a bitstream including the encoded data, and the encoding mode information of the picture, and transmit the bitstream of the picture.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the transmission unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the transmission unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 coding units of the lower depth.

The video encoding apparatus 100 may determine coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

If an image having high resolution or large data amount is encoded in a conventional macroblock of 16×16 or 8×8, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, final video compression efficiency may be increased since a coding unit is adjusted while considering characteristics of an image while increasing a maximum size of a coding unit while considering a size of the image.

The encoding based on the bit depth increment according to an exemplary embodiment may allow more accurate prediction encoding such as motion estimation, etc., and utilization of full dynamic ranges based on the increased bit depth, thereby more accurately performing prediction encoding.

Figure 2:
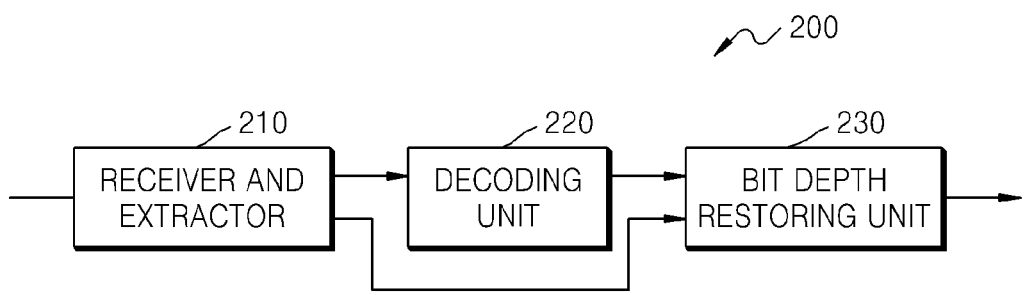
FIG. 2 is a block diagram of an apparatus for decoding a video based on a bit depth increment, according to an exemplary embodiment.

FIG. 2 is a block diagram of a video decoding apparatus 200 based on a bit depth increment, according to an exemplary embodiment.

The video decoding apparatus 200 based on a bit depth increment (hereinafter referred to as the "video decoding apparatus 200") includes a receiver and extractor 210, a decoding unit 220, and a bit depth restoring unit 230.

Definitions of various terms, such as a coding unit, a depth, a prediction unit, a transformation unit, and information about various encoding modes, for various operations of the video decoding apparatus 200, are identical to those described with reference to FIG. 1 and the video encoding apparatus 100.

The receiver and extractor 210 parses a received bitstream, and extracts encoded image data for each coding unit of a current image, encoding mode information about coding units of a tree structure, and information about the bit depth increment from the parsed bitstream. The receiver and extractor 210 may extract the information about the bit depth increment from a SPS or a PPS of the received bitstream of a picture.

The information about the coded depth and the encoding mode according to each maximum coding unit extracted by the receiver and extractor 210 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the receiver and extractor 210 may extract the information about the coded depth and the encoding mode according to the predetermined data units. The predetermined data units to which the same information about the coded depth and the encoding mode is assigned may be inferred to be the data units included in the same maximum coding unit.

The decoding unit 220 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The decoding unit 220 may perform intra prediction or motion compensation according to a partition and a prediction mode of each coding unit, based on the information about the partition type and the prediction mode of the prediction unit of the coding unit according to coded depths.

Also, the decoding unit 220 may perform inverse transformation according to each transformation unit in the coding unit, based on the information about the size of the transformation unit of the coding unit according to coded depths, so as to perform the inverse transformation according to maximum coding units.

The decoding unit 220 may determine at least one coded depth of a current maximum coding unit by using split information according to depths. If the split information indicates that image data is no longer split in the current depth, the current depth is a coded depth. Accordingly, the decoding unit 220 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoding unit 220 in the same encoding mode.

The bit depth restoring unit 230 determines a de-scaling method corresponding to a scaling method that increases a bit depth of an original image based on the information about the bit depth increment extracted by the receiver and extractor 210.

The bit depth restoring unit 230 may restore a bit depth of an internal image to a bit depth of the original image by reducing the bit depth of the internal image by applying the de-scaling method to pixel values of the internal image. A dynamic range of a restored image in which the bit depth is reduced according to the de-scaling method determined by the bit depth restoring unit 230 may be the same as a dynamic range based on the bit depth of the original image.

The de-scaling method for the bit depth increment according to the present embodiment may be realized in various ways according to the corresponding scaling method. Four de-scaling methods corresponding to four scaling methods described with reference to the video encoding apparatus 100 of FIG. 1 will now be described below.

For convenience of description, when a minimum value and a maximum value of the dynamic range based on the bit depth of the original image are referred to a first minimum value and a first maximum value, respectively, the first minimum value is 0, and the first maximum value is obtained by subtracting 1 from a value obtained by raising 2 to the power of the bit depth of the input image. The bit depth restoring unit 230 restores the bit depth by applying the de-scaling method to the restored image, thereby determining that the dynamic range based on the restored bit depth corresponds to the dynamic range based on the bit depth of the original image.

When the internal image that is restored through encoding and decoding processes after the bit depth of the internal image increases according to the first scaling method is input into the bit depth restoring unit 230, a minimum value of a dynamic range based on the bit depth of the internal image may be 0, and a maximum value thereof may be obtained by left-shifting a bit stream of the maximum value of the dynamic range of the original image by a bit increment. The bit depth restoring unit 230 may perform a bit operation that right-shifts, by the bit increment, a bit stream of a value obtained by summing an error between an ideal dynamic range increased based on a bit depth obtained by summing the bit increment and the bit depth of the original image and a real dynamic range of the internal image and pixel values of the internal image according to a first de-scaling method corresponding to the first scaling method. An error between the ideal dynamic range according to the bit depth increment and the real dynamic range of the internal image may be the same as a value obtained by left-shifting a bit stream of 1 by a value obtained by subtracting 1 from the bit increment.

When the internal image that is restored through encoding and decoding processes after the bit depth of the internal image increases according to the second scaling method is input into the bit depth restoring unit 230, a minimum value of a dynamic range based on the bit depth of the internal image may be 0, and a maximum value thereof may be obtained by subtracting 1 from a value obtained by raising 2 to the power of the sum of the bit depth of the original image and the bit increment. That is, the dynamic range of the internal image is a value obtained by subtracting 1 from a value obtained by raising 2 to the power of the sum of the bit depth of the original image and the bit increment.

A second de-scaling method corresponding to the second scaling method may be determined according to an operation that multiplies the dynamic range of the original image by the pixel values of the input image and divides the multiplied value by the dynamic range of the input image. That is, the bit depth restoring unit 230 according to the second de-scaling method may perform an operation that divides, by the dynamic range of the input image, a value obtained by subtracting the pixel values of the input image from a value obtained by left-shifting bit streams of the pixel values of the input image by the bit depth of the original image.

When the internal image that is restored through encoding and decoding processes after the bit depth of the internal image increases according to the third scaling method is input into the bit depth restoring unit 230, a minimum value of the dynamic range based on the bit depth of the input image may be obtained by subtracting 1 from a value obtained by raising 2 to the power of the bit increment, and a maximum value thereof may be obtained by subtracting 1 from a value obtained by raising 2 to the power of the sum of the bit depth of the original image and the bit increment.

A third de-scaling method corresponding to the third scaling method may be determined according to an operation that decreases, by the bit increment, bit depths of values obtained by summing 1 and the pixel values of the internal image. That is, the bit depth restoring unit 230 according to the third de-scaling method may output pixel values of the restored image according to a bit operation that subtracts 1 from a value obtained by right-shifting, by the bit increment, bit streams of values obtained by summing 1 and the pixel values of the internal image.

When the internal image that is restored through encoding and decoding processes after the bit depth of the internal image increases according to the fourth scaling method is input into the bit depth restoring unit 230, a fourth de-scaling method corresponding to the fourth scaling method may be determined according to an operation that decreases, by the bit increment, a bit depth obtained by subtracting a maximum integral number that is smaller than or is equal to a value obtained by decreasing bit depths of pixel values of the internal image by a difference between the bit depth of the original image and the bit increment, from pixel values of the internal image.

That is, the bit depth restoring unit 230 according to the fourth de-scaling method may perform a bit operation that right-shifts, by the bit increment, bit streams of values obtained by subtracting, from pixel values of the internal image, a maximum integral number that is smaller than or is equal to a value obtained by right-shifting bit depths of pixel values of the internal image by the bit depth of the original image.

For convenience of description, although the first through fourth scaling and de-scaling methods are used to adjust a bit depth by the video encoding apparatus 100 and the video decoding apparatus 200, the exemplary embodiment is not limited thereto. A variety of scaling and de-scaling methods may be used in such a way that a dynamic range of a restored image having a reduced bit depth according to a de-scaling method is identical to a dynamic range based on a bit depth of an original image, and pixel values of the restored image correspond respectively to pixel values of the original image.

The video decoding apparatus 200 may decode encoded image data based on coding units of a tree structure having hierarchically adjusted sizes for each region while considering characteristics of a mass-storage data image, based on encoding mode information about encoding based on the coding units of the tree structure, while increasing a maximum size of a coding unit while considering a size of the image.

The decoding based on a bit depth increment according to an exemplary embodiment may allow decoding of encoding data on which prediction encoding such as a motion estimation, etc., is more accurately performed based on encoding mode information through utilization of all dynamic ranges based on an increased bit depth, and restoration of an internal image having the increased bit depth. Without performing a clipping process on a restored image generated after performing a de-scaling process on an internal image, a dynamic range of the restored image may be the same as a dynamic range of an original image.

Figure 3:
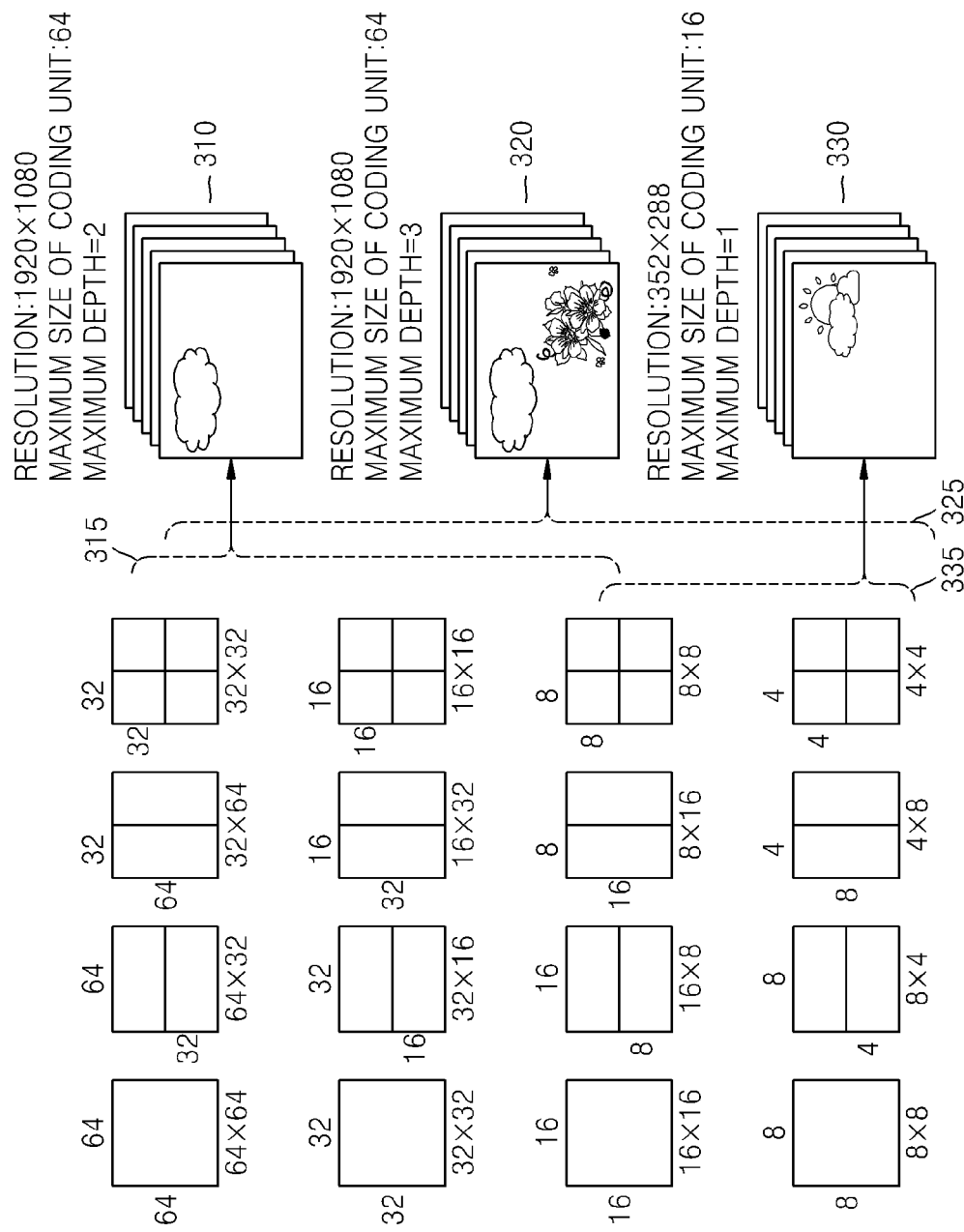
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
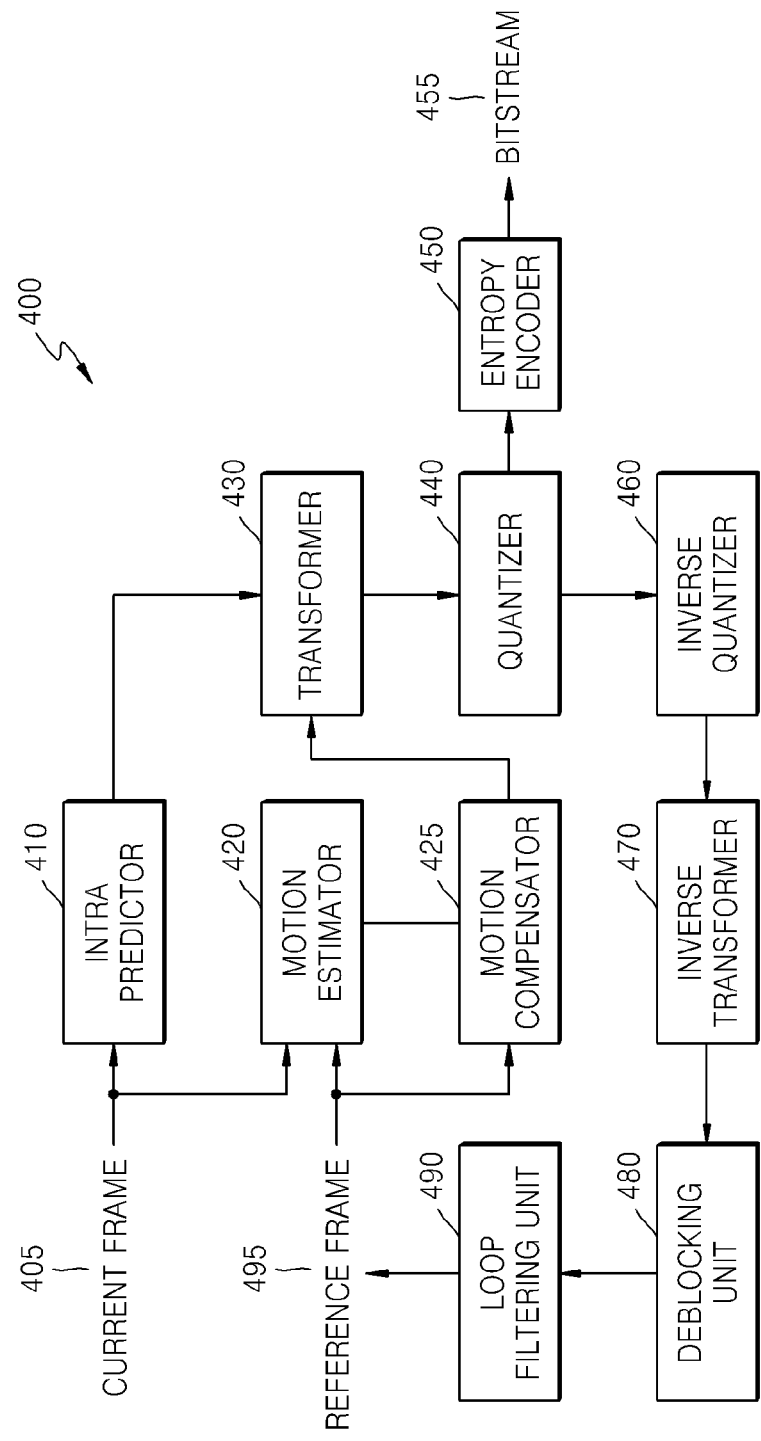
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
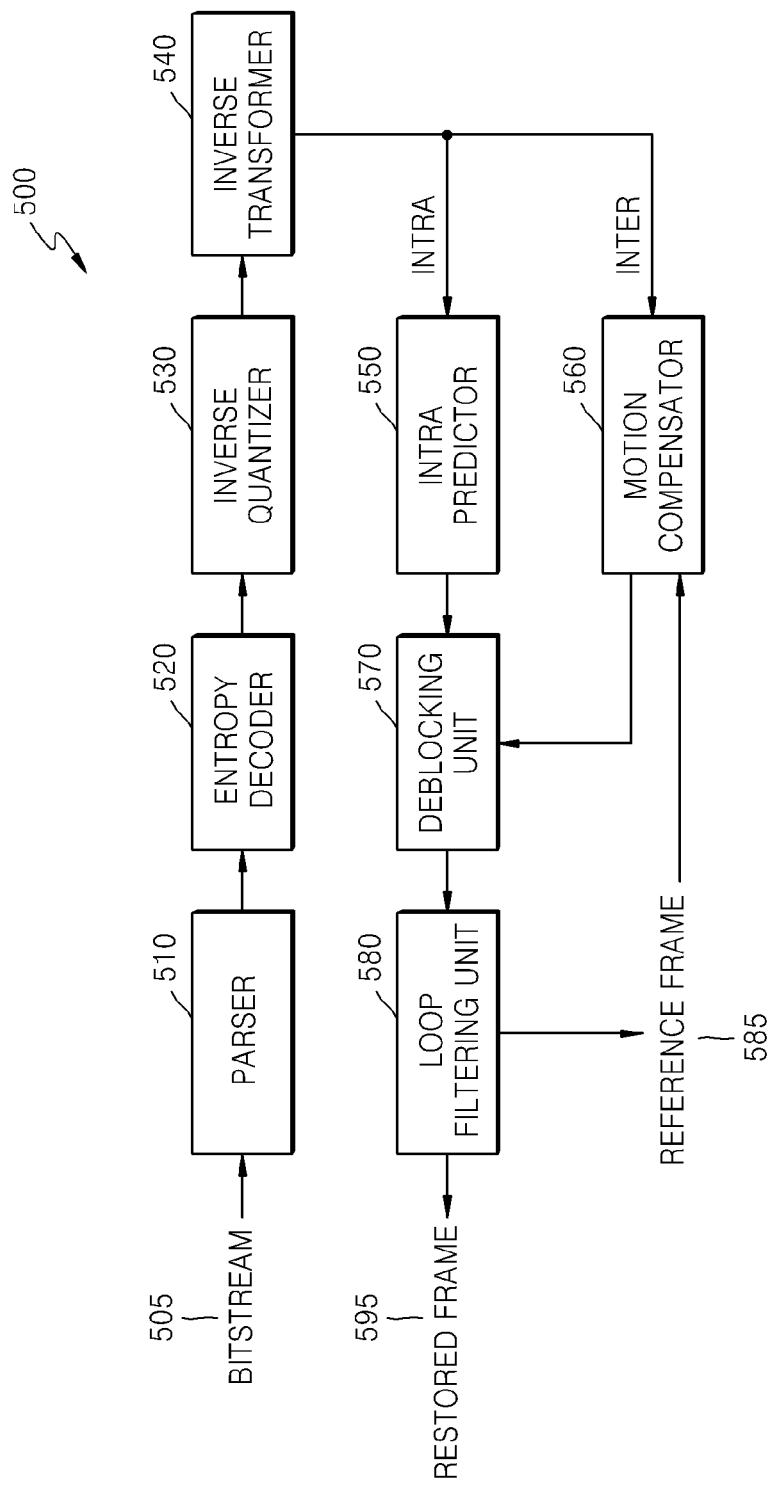
FIG. 5 is a block diagram of an image decoder based on coding units according to an exemplary embodiment.

Also, since encoding based on a bit depth increment according to an exemplary embodiment may allow prediction encoding such as a motion estimation, etc., using data with an more expanded dynamic range, prediction encoding may be performed by more accurately referring to image details and adjacent information. FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Also, since decoding based on a bit depth increment according to an exemplary embodiment may allow prediction decoding such as a motion compensation, etc., using data with an more expanded dynamic range, the video may be restored more accurately by prediction decoding with reference to image details and adjacent information.

Figure 6:
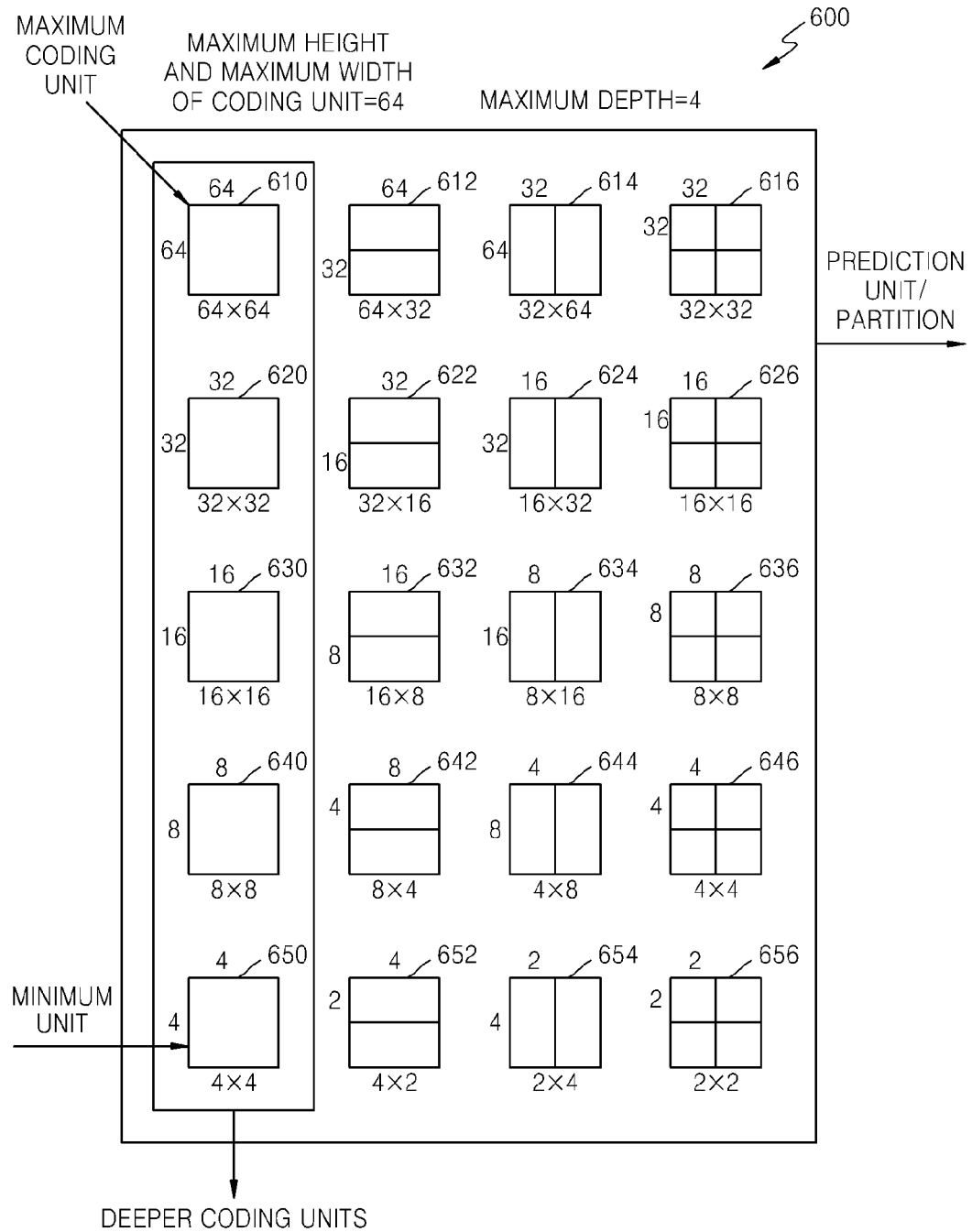
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 may be assigned to a partition having a size of 4×4. Also, a prediction unit of the coding unit 650 having the size of 4×4 and the depth of 4 may include partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The receiver and extractor 210 of the video decoding apparatus 200 may extract and the decoding unit 220 may use the information 800, 810, and 820 for decoding, according to each deeper coding unit.

Figure 9:
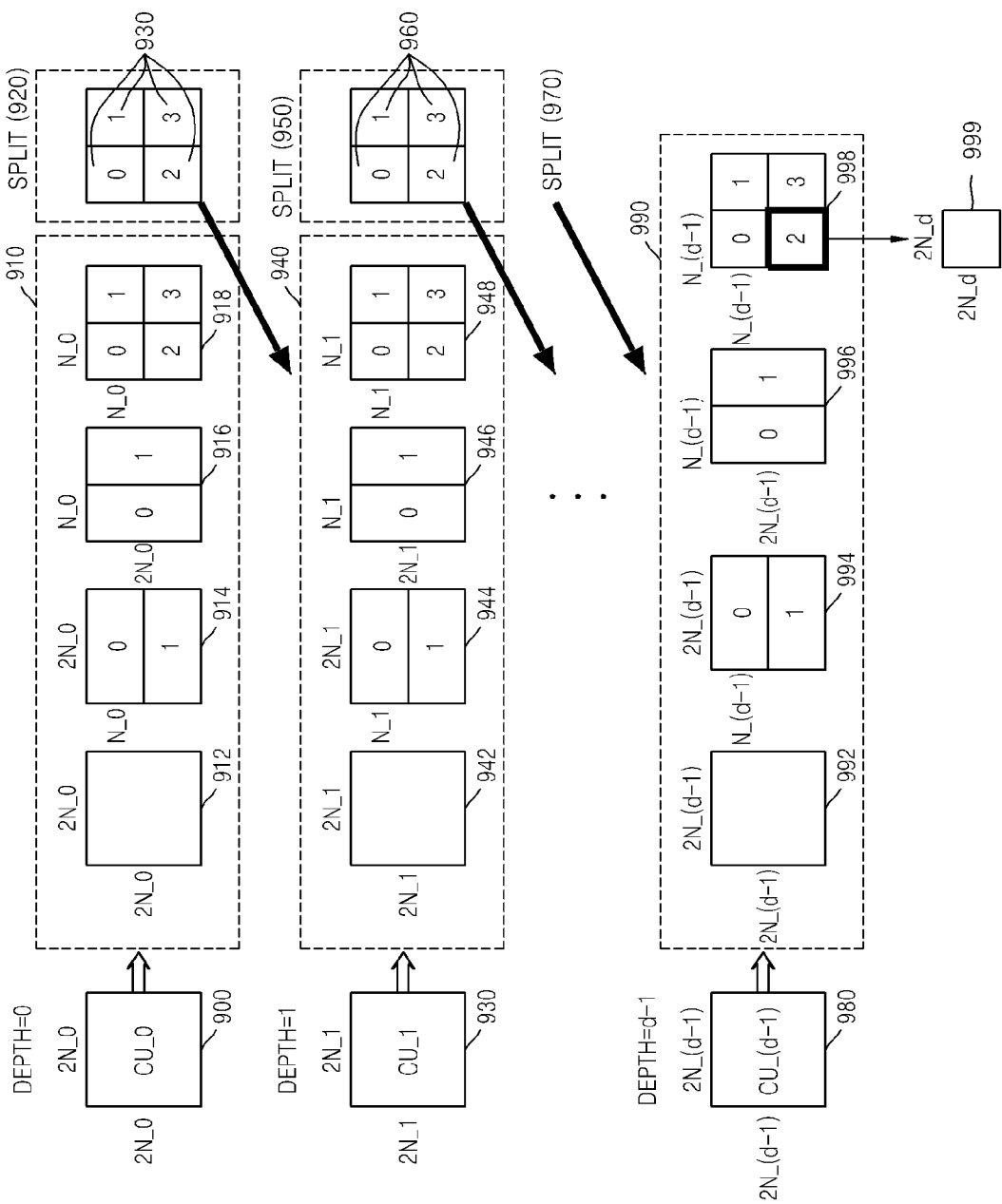
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The receiver and extractor 210 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
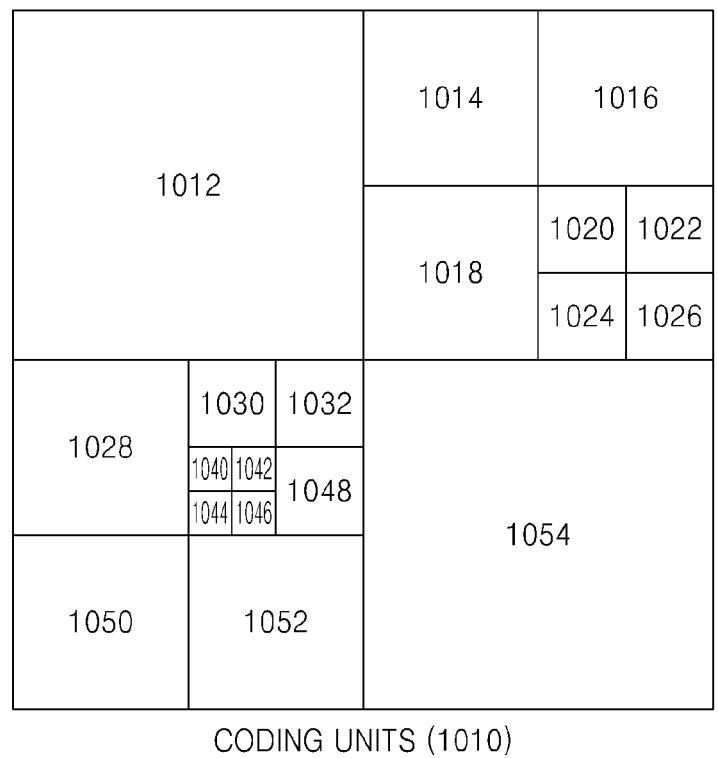
FIGS. 10 through 12 are diagrams for describing a relationship between coding units, prediction units, and transformation units, according to an exemplary embodiment.
Figure 11:
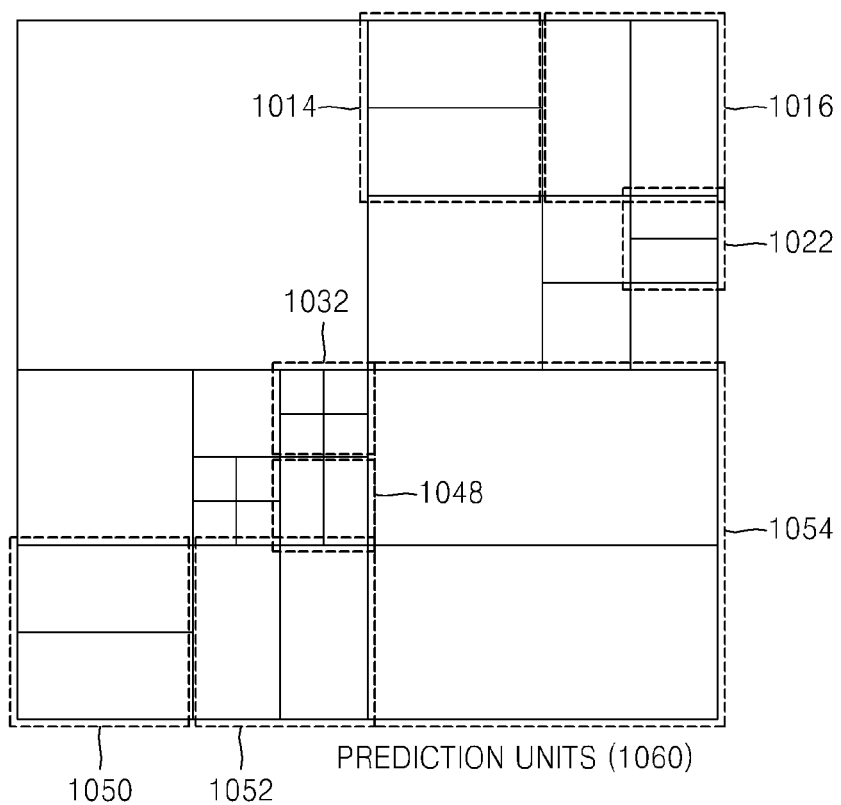
Figure 12:
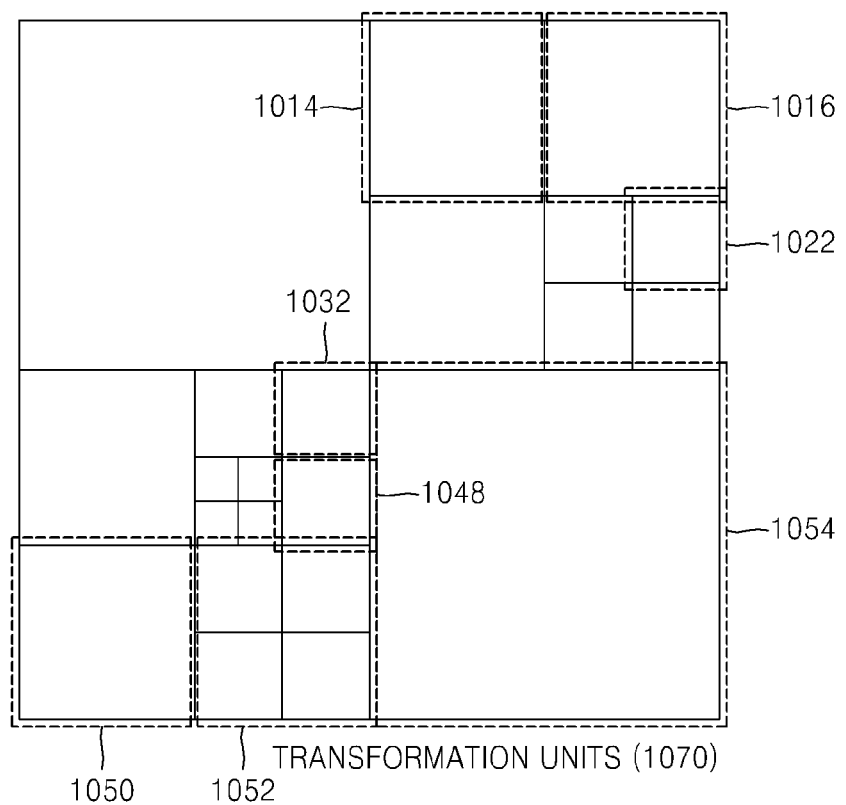

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N.

Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit.

TABLE 1

| Split Information 0 (Encoding on Coding Unit having Size of 2Nx2N and Current Depth of d) | | | | | Split Information 1 |
| --- | --- | --- | --- | --- | --- |
| Prediction Mode | Partition Type | | Size of Transformation Unit | | |
| Intra Inter Skip (Only 2Nx2N) | Symmetrical Partition Type 2Nx2N 2NxN Nx2N NxN | Asymmetrical Partition Type 2NxnU 2NxnD nLx2N nRx2N | Split Information 0 of Transformation Unit 2Nx2N | Split Information 1 of Transformation Unit NxN (Symmetrical Type) N/2xN/2 (Asymmetrical Type) | Repeatedly Encode Coding Units having Lower Depth of d + 1 |

The transmission unit 130 of the video encoding apparatus 100 may output the encoding information about the coding units having a tree structure, and the receiver and extractor 210 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
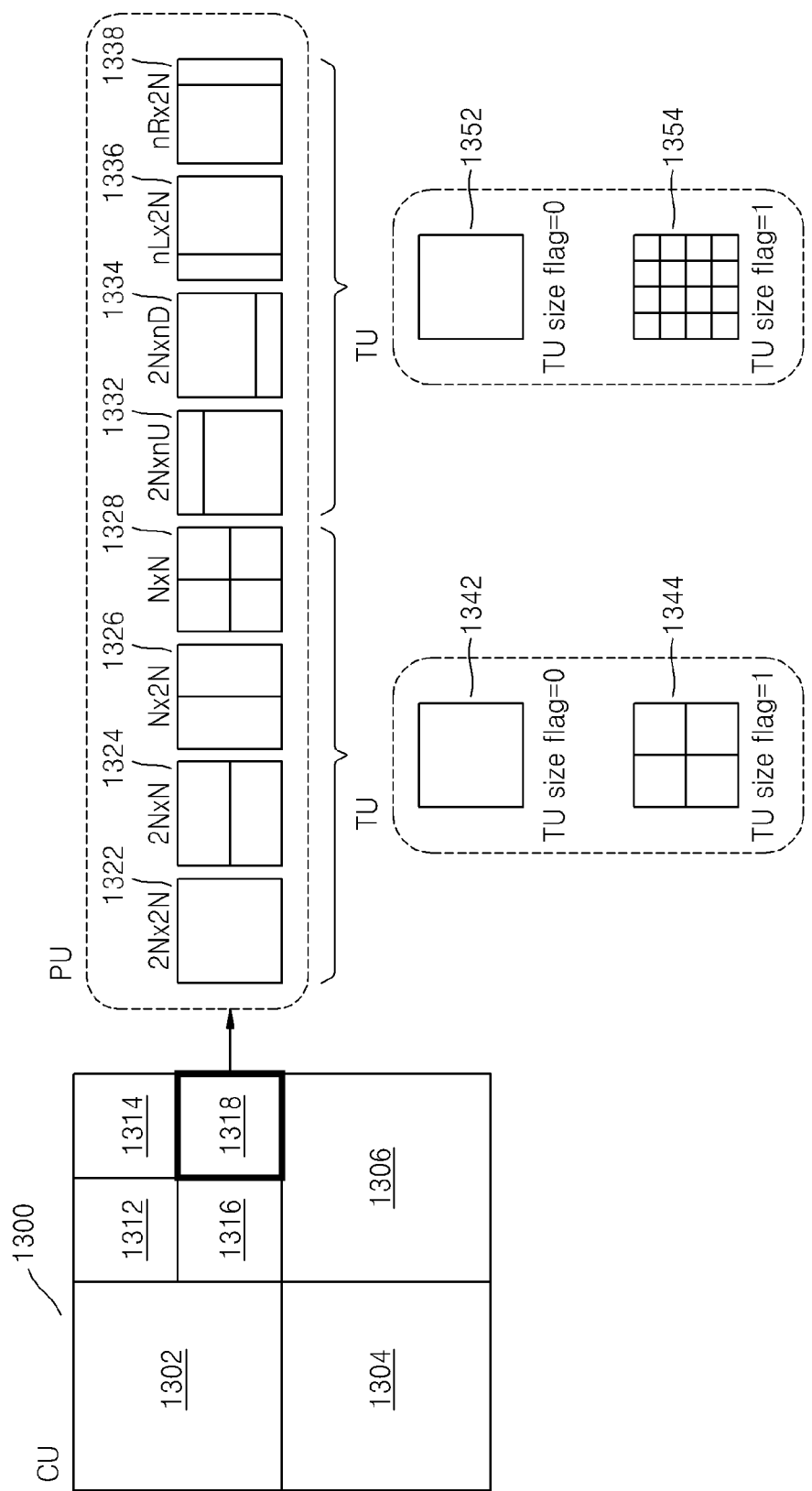
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths.

Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

Scaling and de-scaling for adjusting a bit depth of an image will now be described with reference to FIGS. 14 through 19.

Figure 14:
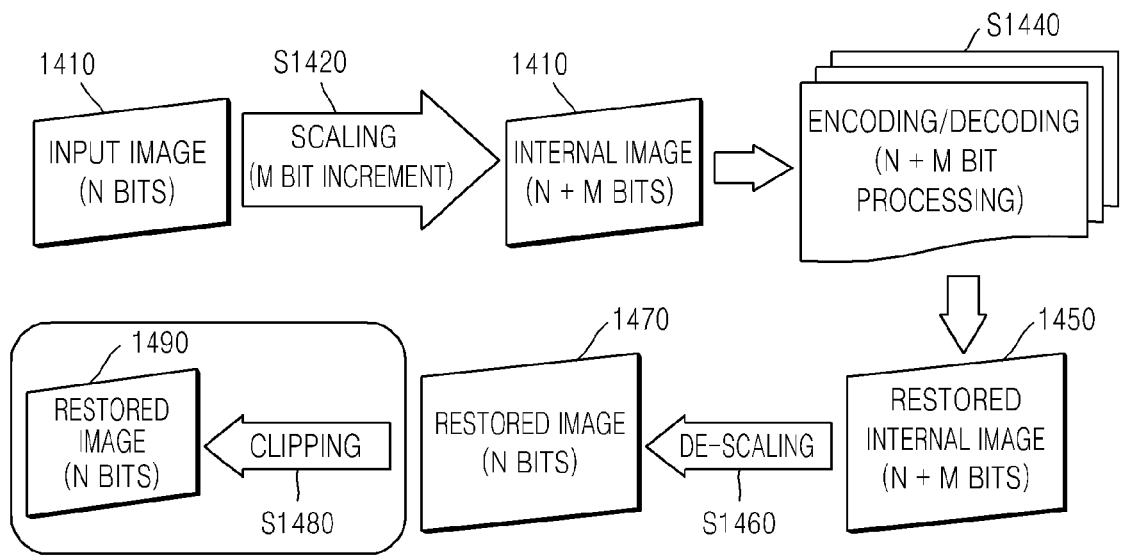
FIG. 14 illustrates encoding and decoding and bit depth restoring processes through a conventional bit depth increment.

FIG. 14 illustrates encoding and decoding and bit depth restoring processes through a conventional bit depth increment.

Referring to FIG. 14, in operation S1420, if scaling is performed on an input image 1410 having N bits as a bit depth to increase the bit depth by M bits, an internal image 1430 having (N+M) bits as a bit depth is generated.

In operation S1440, a transmission end outputs encoded data by encoding the internal image 1430, and a reception end outputs a restored internal image 1450 having (N+M) bits as a bit depth by receiving the encoded data and decoding the received encoded data. Encoding and decoding performed in operation S1440 are based on (N+M) bit processing. In this case, an error may occur between an ideal dynamic range increased according to a bit depth increment and a dynamic range of the restored internal image 1450. In spite of the bit depth increment, encoding and decoding are performed based on (N+M) bit processing without wholly using the ideal dynamic range that is increased according to the bit depth increment.

In operation S1460, if de-scaling is performed on the restored internal image 1450 to decrease the bit depth of the restored internal image 1450 having (N+M) bits, a restored image 1470 having N bits as the bit depth is generated.

Although the bit depth of the restored image 1470 is decreased and is restored to the bit depth of the input image 1410, a dynamic range of the restored image 1470 may not correspond to a dynamic range of the input image 1410. In this case, in operation S1480, to generate a restore image 1490 having a dynamic range corresponding to the dynamic range of the input image 1410, a clipping operation is performed on the restored image 1470.

Figure 15:
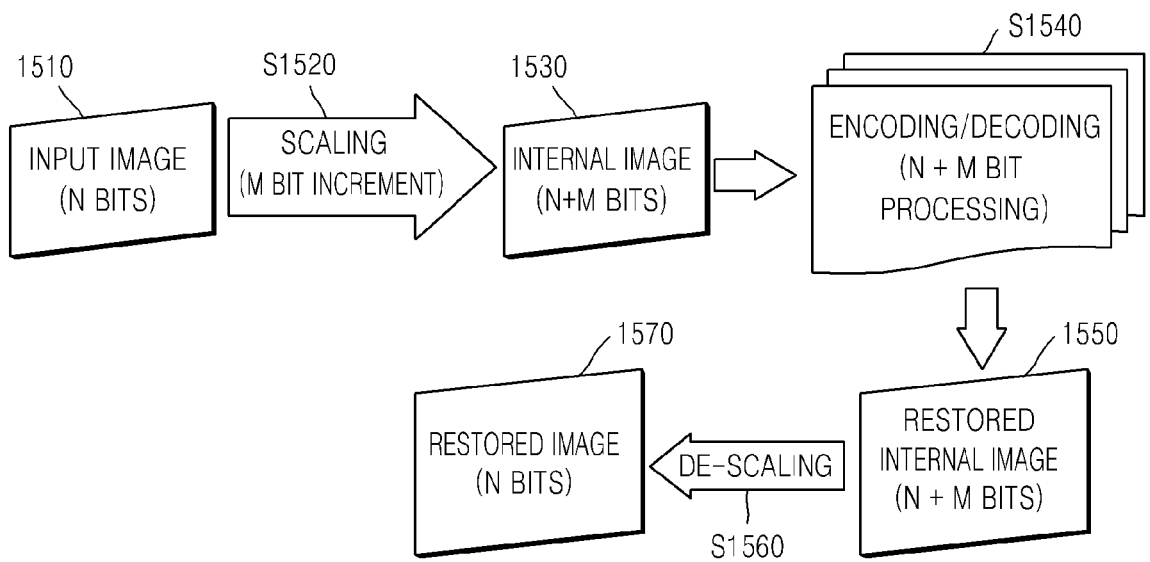
FIG. 15 illustrates encoding and decoding and bit depth restoring processes through a bit depth increment, according to an exemplary embodiment.

FIG. 15 illustrates encoding and decoding and bit depth restoring processes through a bit depth increment, according to an exemplary embodiment.

Referring to FIG. 15, in operation S1520, if scaling is performed on an input image 1510 having N bits as a bit depth to increase the bit depth of the input image 1510 by M bits according to a scaling method of the video encoding apparatus 100 according to an exemplary embodiment, an internal image 1530 having (N+M) bits as a bit depth is generated.

In operation S1540, encoded data may be output by encoding the internal image 1530 based on (N+M) bit processing, and a restored internal image 1550 having (N+M) bits as a bit depth may be output by decoding the encoded (N+M) bit processed data.

In operation S1560, if de-scaling is performed on the restored internal image 1550 having (N+M) bits according to a de-scaling method of the video decoding apparatus 200 according to an exemplary embodiment, a restored image 1570 having N bits as a bit depth may be generated.

According to the scaling method of the video encoding apparatus 100 and the de-scaling method of the video decoding apparatus 200 according to an exemplary embodiment, since a dynamic range of the restored image 1570 corresponds to a dynamic range of the input image 1510, the bit depth of the restored image 150 may be restored to the bit depth of the input image 1510 without having to perform a clipping operation on the restored image 1570, and an ideal dynamic range according to a bit depth increment may be used at the maximum.

FIGS. 16 through 19 are graphs for describing scaling methods for a bit depth increment and de-scaling methods for a bit depth restoration, according to exemplary embodiments.

In the embodiments with reference to FIGS. 16 through 19, a bit depth 'bitdepth' of an input image, i.e. an original image, is 8 bits, a bit increment 'bit_increment' according to the bit depth increment is 4 bits, and a bit depth 'bitdepth+bit_increment' of an internal image having an increased bit depth is 12 bits. Therefore, a dynamic range based on the bit depth 'bitdepth' of the original image is between 0 through $2^8-1$, i.e., 255.

Figure 16:
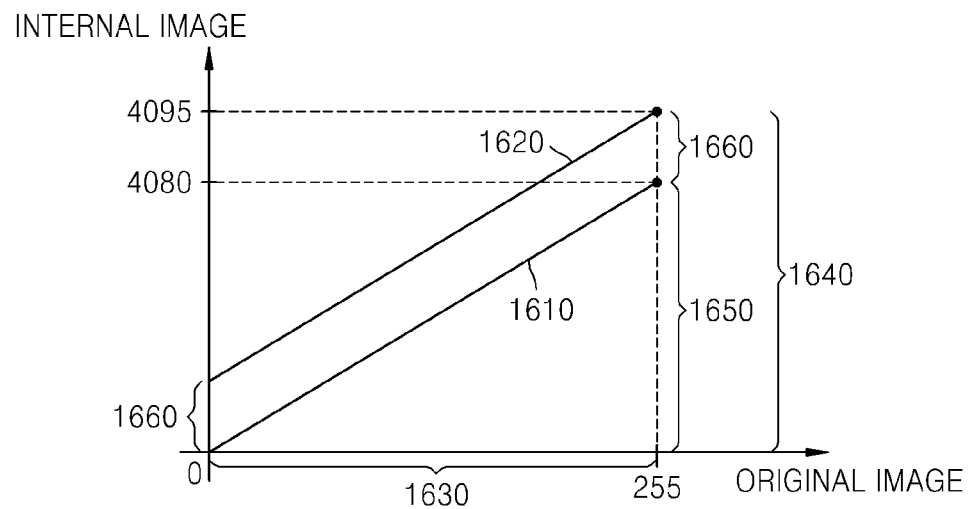
FIGS. 16 through 19 are graphs for describing scaling methods for a bit depth increment and de-scaling methods for a bit depth restoration according to exemplary embodiments.

A first scaling method and a first de-scaling method are explained with reference to FIG. 16.

The first scaling method for the original image follows Equation 11 below.

$$\text{pel} << \text{bit\_increment} \qquad [\text{Equation 11}]$$

According to the first scaling method of Equation 11, a pixel value of an internal image having a bit depth increment of 4 greater than a pixel value of an original image, may be output by left-shifting a pixel value pel of the original image by a bit increment. A slope of a relational expression 1610 that is a 1:1 function of the first scaling method of Equation 11 may be a value obtained by raising 2 to the power of the pixel value pel of the original image by the bit increment, i.e. a value obtained by multiplying $2^4$ by the pixel value pel of the original image. Furthermore, since a dynamic range 1630 of the original image is between 0 through 255, a dynamic range 1650 of the internal image is between 0 through $255 \times 2^4$, i.e. 0 through 4080.

A first de-scaling method for a restored internal image is given by Equation 12 below.

$$(\text{pel}+(1<<(\text{bit\_increment}-1)))>>\text{bit\_increment} \qquad [\text{Equation 12}]$$

According to the first de-scaling method of Equation 12, a pixel value of the restored image may be output according to an operation that right-shifts, by the bit increment of 4, a value obtained by summing the pixel value pel of the internal image and a value obtained by left-shifting 1 by a value obtained by subtracting 1 from the bit increment of 4, i.e. by 3 bits. In this regard, the value obtained by left-shifting 1 by the value obtained by subtracting 1 from the bit increment of 4 corresponds to an error 1660 between an ideal dynamic range 1640 increased according to the bit depth increment and a real dynamic range 1650 of the internal image increased according to the first scaling method. According to a relational expression 1620 that is a 1:1 function of the first scaling method of Equation 12, the real dynamic range 1650 of the internal image may be restored to a dynamic range 1630 of the original image after compensating for the error 1660.

Figure 17:
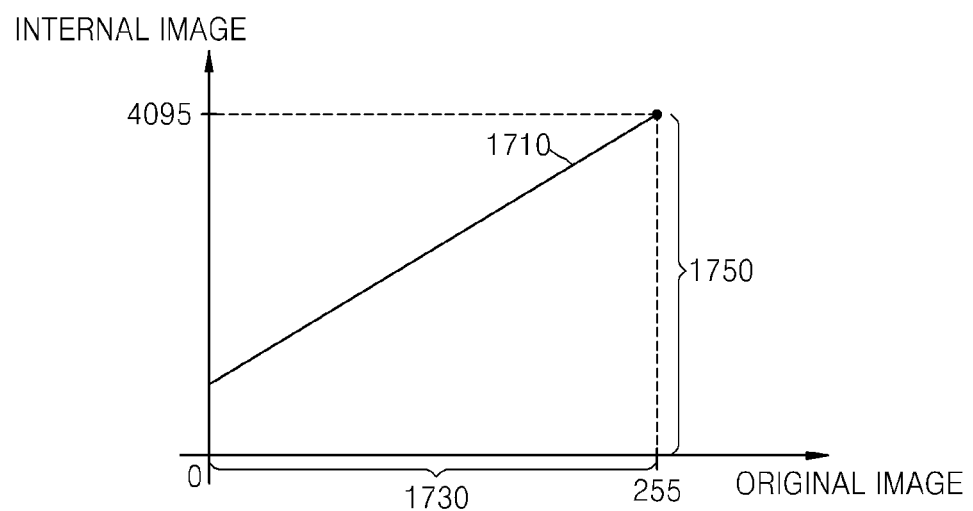

A second scaling method and a second de-scaling method are explained with reference to FIG. 17.

The second scaling method for an original image is given by Equations 13 and 14 below.

$$\text{pel}=\text{pel}*(2^{bitdepth+bit\_increment}-1)/(2^{bitdepth}-1) \qquad [\text{Equation 13}]$$

$$\text{pel}=((\text{pel}<<(\text{bitdepth}+\text{bit\_increment}))-\text{pel})/(2^{bitdepth}-1) \qquad [\text{Equation 14}]$$

According to the second scaling method of Equation 13, a pixel value of an internal image may be output through an operation that multiplies the pixel value pel of the original image by a dynamic range '$2^{bitdepth+bit\_increment}-1$' based on an increased bit depth, and divides the multiplied value by a dynamic range '$2^{bitdepth}-1$' of the original image. Furthermore, according to Equation 14 of a bit operation for a multiplication portion of the second scaling method of Equation 13, an operation may be performed whereby a value obtained by subtracting the pixel value pel of the original image from a value obtained by left-shifting, by a sum of a bit depth 'bitdepth' of the original image and a bit increment 'bit_increment', a bit stream of the pixel value pel of the original image, is divided by the dynamic range '$2^{bitdepth}-1$' of the original image.

According to a relational expression 1710 that is a 1:1 function of the second scaling method of Equation 13, an output value obtained by multiplying a dynamic range $2^{12}-1$, i.e. 4095, increased according to the bit depth increment by the pixel value pel of the original image, and dividing the multiplied value by a dynamic range $2^8-1$, i.e. 255, may be the pixel value of the internal image. Furthermore, since a dynamic range 1730 of the original image is between 0 through 255, a dynamic range 1750 of the internal image is between 0 through 255×4095/255, i.e. 0 through 4095.

The second de-scaling method for the restored internal original image is given by Equations 15 and 16 below.

$$\text{pel}=\text{pel}*(2^{bitdepth}-1)/(2^{bitdepth+bit\_increment}-1) \qquad [\text{Equation 15}]$$

$$\text{pel}=((\text{pel}<<\text{bitdepth})-\text{pel})/(2^{bitdepth+bit\_increment}-1) \qquad [\text{Equation 16}]$$

According to the second de-scaling method of Equation 15, a pixel value of the restored internal image may be output through an operation that multiplies the pixel value pel of the restored internal image by a dynamic range '$2^{bitdepth}-1$' of the original image, and divides the multiplied value by a dynamic range '$2^{bitdepth+bit\_increment}-1$' based on an increased bit depth. Furthermore, according to Equation 16 representing a bit operation for a multiplication portion of the second de-scaling method of Equation 15, an operation may be performed whereby a value obtained by subtracting the pixel value pel of the restored internal image from a value obtained by right-shifting, by a bit depth 'bitdepth' of the original image, a bit stream of the pixel value pel of the restored internal image, is divided by the dynamic range '$2^{bitdepth+bit\_increment}-1$' based on the increased bit depth.

A 1:1 function of the second de-scaling method of Equation 15 is an inverse function of the relational expression 1710 that is the 1:1 function of the second scaling method of Equation 13. According to the 1:1 function of the second de-scaling method of Equation 15, an output value, which is obtained by multiplying a dynamic range $2^8-1$, i.e. 255, of the original image by the pixel value pel of the restored internal image, and dividing the multiplied value by a dynamic range $2^{12}-1$, i.e. 4095, increased according to the bit depth increment, may be the pixel value of the restored internal image. Furthermore, since the dynamic range 1750 of the internal image is between 0 through 255×4095/255, i.e. 0 through 4095, the dynamic range 1730 of the original image is between 0 through 255. That is, according to the second de-scaling method of Equations 15 and 16, the dynamic range 1730 of the original image may be restored to a dynamic range of the original image.

Figure 18:
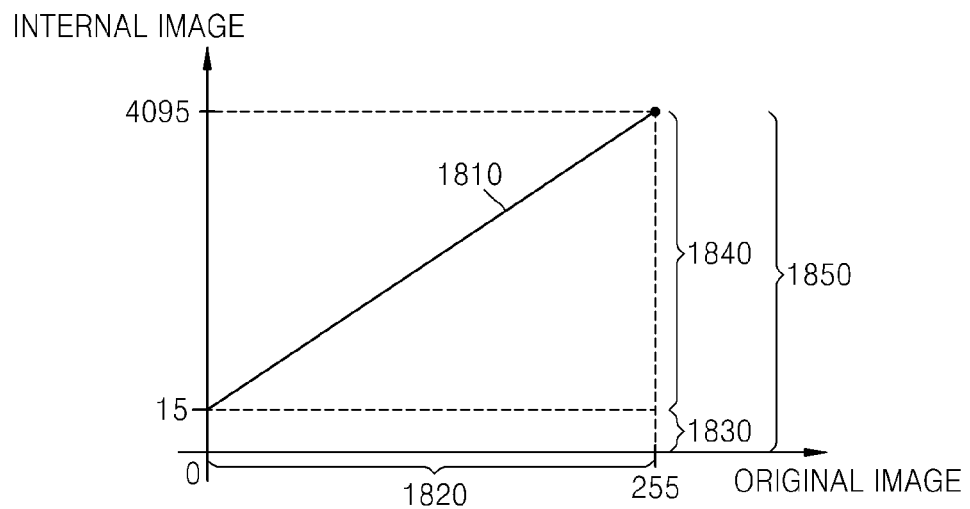

A third scaling method and a third de-scaling method are explained with reference to FIG. 18.

The third scaling method for an original image is given by Equation 17 below.

$$((pel+1)<<bit\_increment)-1 \qquad [\text{Equation 17}]$$

According to the third scaling method of Equation 17, a pixel value of an internal image may be output through an operation that subtracts 1 from a value obtained by left-shifting, by a bit increment bit_increment, a bit stream of a value obtained by summing the pixel value pel of the original image and 1. That is, according to a relational expression 1810 that is a 1:1 function of the third scaling method of Equation 17, a value obtained by summing a value obtained by multiplying the pixel value pel of the original image by a value $2^4$ obtained by raising 2 to the power of the bit increment and the value $2^4$ obtained by raising 2 to the power of the bit increment, and subtracting 1 from the summed value may be output as a pixel value of an internal image. Thus, since a dynamic range 1820 of the original image is between 0 through 255, a dynamic range 1840 of the internal image is from a value obtained by subtracting 1 from the value $2^4$ obtained by raising 2 to the power of the bit increment to a maximum value of an ideal dynamic range 1850 according to a bit depth increment, i.e. 15 through 4095.

The third de-scaling method for the restored internal original image is given by Equation 18 below.

$$((pel+1)>>bit\_increment)-1 \qquad [\text{Equation 18}]$$

According to the third de-scaling method of Equation 18, a pixel value of the restored internal image may be output through an operation that subtracts 1 from a value obtained by right-shifting, by the bit increment, a bit stream of a value obtained by summing the pixel value pel of the restored internal image and 1. Thus, a bit depth of the value obtained by summing the pixel value pel of the internal image and 1 decreases by the bit increment, and thus a bit depth of the restored internal image may be restored.

A 1:1 function of the third de-scaling method of Equation 18 is an inverse function of the relational expression 1810 that is the 1:1 function of the third scaling method of Equation 17. According to the 1:1 function of the third de-scaling method of Equation 18, the dynamic range 1840 of the internal image may be restored to the dynamic range 1820 of the original image. According to the third scaling method and the third de-scaling method, most of the dynamic range 1840 that excludes a dynamic range 1830 between 0 and the value obtained by subtracting 1 from the value $2^4$ obtained by raising 2 to the power of the bit increment, from an ideal dynamic range 1850 according to a bit depth increment, may be used, and the bit depth may be adjusted according to an operation of a bit shift, thereby performing a fast operation.

Figure 19:
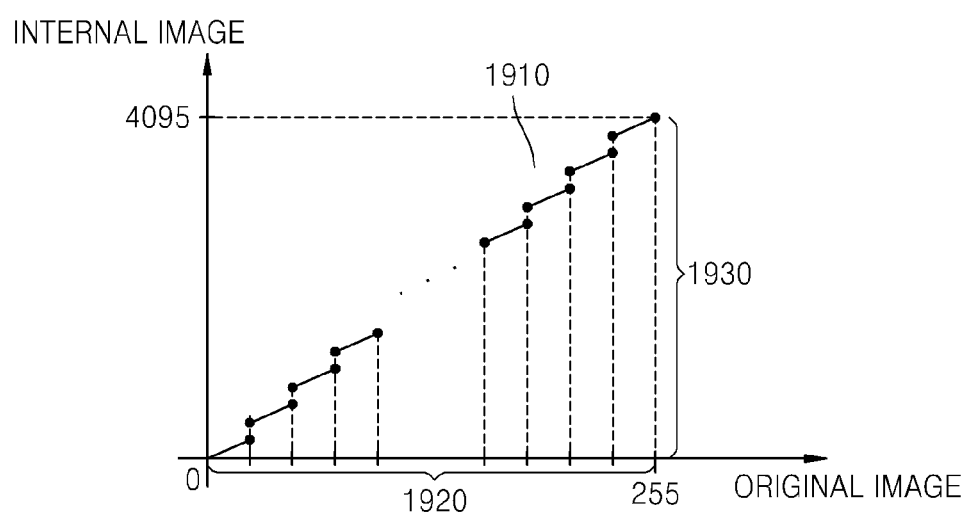

A fourth scaling method and a fourth de-scaling method are explained with reference to FIG. 19.

The fourth scaling method for an original image is given by Equation 19 below.

$$(pel<<bit\_increment)+fix(pel>>(bitdepth-bit\_increment)) \qquad [\text{Equation 19}]$$

fix(x) of Equation 19 outputs a maximum integral number smaller than or equal to x. According to the fourth scaling method of Equation 19, a pixel value of an internal image may be output through an operation that sums a value obtained by left-shifting, by a value obtained by subtracting a bit increment from a bit depth, the pixel value pel of the original image and a maximum value smaller than or equal to a value obtained by right-shifting, by the bit increment, the pixel value of the original image. That is, according to a relational expression 1910 that is a 1:1 function of the fourth scaling method of Equation 19, a value obtained by summing a value obtained by multiplying the pixel value pel of the original image by a value $2^4$ obtained by raising 2 to the power of a difference value between the bit increment and the bit depth and a maximum value smaller than or equal to a value obtained by dividing the pixel value of an original image by the value $2^4$ may be output as a pixel value of an internal image. Thus, since a dynamic range 1920 of the original image is between 0 through 255, a dynamic range 1930 of the internal image may include an ideal dynamic range according to a bit depth increment, i.e. most of a range between 0 through 4095.

The fourth de-scaling method for the restored internal original image follows Equation 20 below.

$$(pel-fix(pel>>bitdepth)>>bit\_increment \qquad [\text{Equation 20}]$$

According to the fourth de-scaling method of Equation 20, a pixel value of the restored internal image may be output through a bit operation that right-shifts, by the bit increment, a bit stream of a value obtained by subtracting a maximum integral number smaller than or equal to a value obtained by right-shifting, by the bit depth, the pixel value of the restored internal image from the pixel value pel of the restored internal image. A 1:1 function of the fourth de-scaling method of Equation 20 is an inverse function of the relational expression 1910 that is the 1:1 function of the fourth scaling method of Equation 19. According to the 1:1 function of the fourth scaling method of Equation 19, the dynamic range 1930 of the restored internal image may be restored to the dynamic range 1920 of the original image.

Figure 20:
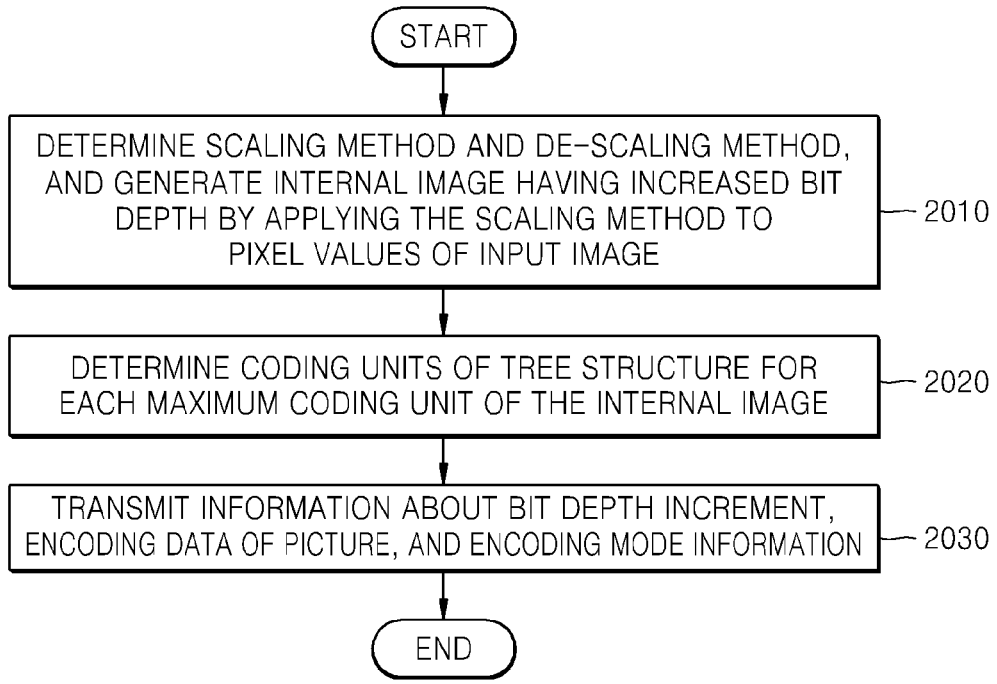
FIG. 20 is a flowchart illustrating a video encoding method based on a bit depth increment, according to another exemplary embodiment.

FIG. 20 is a flowchart illustrating a video encoding method based on a bit depth increment, according to another exemplary embodiment.

Referring to FIG. 20, in operation 2010, an internal image having an increased bit depth is generated by applying a determined scaling method to pixel values of an input image. In this regard, the scaling and de-scaling methods may be determined in such a way that a dynamic range, which is based on a bit depth of a restored image decreased according to a de-scaling method to decrease the increased bit depth, corresponds to a dynamic range based on a bit depth of the input image, and the pixel values of the input image (or the restored image) correspond respectively to pixel values of an internal image.

In operation 2020, coding units of a tree structure are determined and encoded for each maximum coding unit split into a data unit of a maximum size to encode data of the increased bit depth.

In operation 2030, information about the bit depth increment is encoded and transmitted along with encoding data of a picture and encoding mode information about the coding unit of the tree structure.

Figure 21:
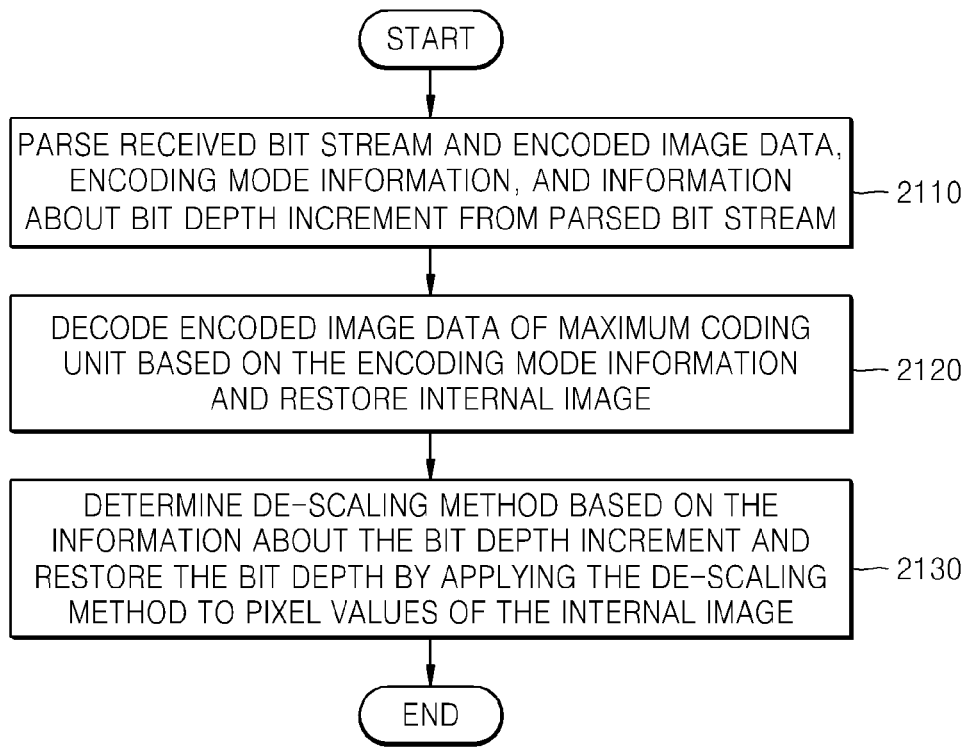
FIG. 21 is a flowchart illustrating a video decoding method based on a bit depth increment, according to another exemplary embodiment.

FIG. 21 is a flowchart illustrating a video decoding method based on a bit depth increment, according to another exemplary embodiment.

Referring to FIG. 21, in operation 2110, a received bit stream is parsed, and encoding mode information about coding units of a tree structure included in each maximum coding unit from among maximum coding units split from a current image, encoded image data for each coding unit, and information about the bit depth increment are extracted from the parsed bit stream.

In operation 2120, the encoded image data for each coding unit is decoded based on the extracted encoding mode information about coding units of the tree structure included in each maximum coding unit, and an internal image is restored.

In operation 2130, a de-scaling method corresponding to a scaling method that increases a bit depth of an original image is determined based on the information about the bit depth increment. A bit depth of the internal image decreases and is restored by applying the de-scaling method to pixel values of the internal image. A dynamic range of the restored image having the decreased bit depth according to the de-scaling method may correspond to a dynamic range based on a bit depth of an input image.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding a video based on a bit depth increment, the method comprising:
    determining a scaling method so that a restored dynamic range based on a bit depth of a restored image formed by de-scaling by the bit depth increment, is identical to an initial dynamic range based on a bit depth of an input image, so the scaling method increases the initial bit depth of the input image, and generating an internal image having the bit depth increased by a predetermined bit increment from the initial bit depth by applying the scaling method to pixel values of the input image; and
    determining coding units having a tree structure of coding depths that are hierarchical in a maximum coding unit, a coded depth of one coding unit in one region of the maximum coding unit being independent of a coded depth of another coding unit in another region of the maximum coding unit, by independently determining the coding units of the coding depths to output an encoding result of the coding units of the coding depths indicating a number of times the maximum coding unit is spatially split, the maximum coding unit being split into a data unit of a maximum size to encode the internal image generated by the bit depth increment,
    wherein a dynamic range of the internal image is increased from the initial dynamic range by scaling the pixel values of the input image by the predetermined bit increment,
    wherein the predetermined bit increment is a fixed value based on a difference between the initial dynamic range and the dynamic range of the internal image,
    wherein the initial dynamic range of the input image is to be restored by compensating the dynamic range of the internal image using an error between a maximum dynamic range according to the increased bit depth and the dynamic range of the internal image and decreasing the compensated dynamic range by the increased bit depth,
    wherein the coded depth of the coding unit is equal to or below a predetermined maximum depth, and
    wherein the coded depth of one coding unit in one region of the maximum coding unit is determined based on split information.

2. The method of claim 1, wherein a first minimum value of the dynamic range based on the initial bit depth of the input image is 0, and a first maximum value of the initial dynamic range based on the initial bit depth of the input image is obtained by subtracting 1 from a value obtained by raising 2 to a power of the initial bit depth of the input image, and
    a second minimum value of the dynamic range of the internal image is 0, and a second maximum value of the dynamic range of the internal image is obtained by left-shifting a bit stream of the first maximum value by the bit increment according to the scaling method.

3. The method of claim 1, wherein a first minimum value of the dynamic range based on the bit depth of the input image is 0, and a first maximum value the dynamic range based on the bit depth of the input image is obtained by subtracting 1 from a value obtained by raising 2 to a power of the bit depth of the input image, and
    a second minimum value of the dynamic range of the internal image is 0, and a second maximum value of the dynamic range of the internal image is obtained by subtracting 1 from a value obtained by raising 2 to a power of a sum of the bit depth increment according to the scaling method and the bit depth of the input image.

4. The method of claim 1, wherein a first minimum value of the dynamic range based on the bit depth of the input image is 0, and a first maximum value of the dynamic range based on the bit depth of the input image is obtained by subtracting 1 from a value obtained by raising 2 to a power of the bit depth of the input image, and
    a second minimum value of the dynamic range of the internal image is obtained by subtracting 1 from a value obtained by raising 2 to a power of the bit depth increment according to the scaling method, and a second maximum value of the dynamic range of the internal image is obtained by subtracting 1 from a value obtained by raising 2 to a power of a sum of the bit depth increment according to the scaling method and the bit depth of the input image.

5. The method of claim 2, wherein the scaling method left-shifts a bit stream of the pixel values of the input image by the bit increment.

6. The method of claim 2, wherein a de-scaling method corresponding to the scaling method right-shifts, by the bit increment, a bit stream of a value obtained by summing the pixel values of the internal image and an error between the second maximum value and a maximum value of the maximum dynamic range increased based on a bit depth obtained by summing the initial bit depth of the input image and the bit increment.

7. The method of claim 6, wherein the error between the second maximum and the maximum value of the maximum dynamic range is a value obtained by left-shifting a bit stream of 1 by a value obtained by subtracting 1 from the bit increment.

8. The method of claim 3, wherein the scaling method multiplies the dynamic range of the internal image by the pixel values of the input image to output a first product and divides the first product by the dynamic range of the input image.

9. The method of claim 8, wherein the scaling method divides, by the dynamic range of the input image, a value obtained by subtracting the pixel values of the input image from a value obtained by left-shifting the bit stream of the pixel values of the input image by the sum of the bit depth increment and the bit depth of the input image.

10. The method of claim 8, wherein a de-scaling method corresponding to the scaling method multiplies pixel values of the restored image by the dynamic range of the input image to output a second product and divides the second product by the dynamic range of the internal image.

11. The method of claim 10, wherein the de-scaling method divides, by the dynamic range of the internal image, a value obtained by subtracting pixel values of the internal image from a value obtained by left-shifting a bit stream of the pixel values of the internal image by the bit depth of the input image.

12. The method of claim 4, wherein the scaling method increases a bit depth of a value obtained by summing the pixel values of the input image and 1 by the bit depth increment.

13. The method of claim 12, wherein the scaling method subtracts 1 from a value obtained by left-shifting, by the bit depth increment, a bit stream of the value obtained by summing the pixel values of the input image and 1.

14. The method of claim 12, wherein a de-scaling method corresponding to the scaling method decreases a bit depth of a value obtained by summing the pixel values of the internal image and 1 by the bit depth increment.

15. The method of claim 14, wherein the de-scaling method subtracts 1 from a value obtained by right-shifting, by the bit depth increment, a bit stream of the value obtained by summing the pixel values of the internal image and 1.

16. The method of claim 3, wherein the scaling method sums a value obtained by increasing the bit depth of the input image by the bit depth increment and a maximum integral number smaller than or equal to a value obtained by decreasing the bit depth of the input image by a difference between the bit depth of the input image and the bit depth increment.

17. The method of claim 16, wherein the scaling method sums a value obtained by left-shifting the bit stream of pixel values of the input image by the bit depth increment and a maximum integral number smaller than or equal to a value obtained by right-shifting the bit stream of pixel values of the input image by the difference between the bit depth of the input image and the bit depth increment.

18. The method of claim 16, wherein a de-scaling method corresponding to the scaling method decreases, by the bit depth increment, a bit depth of a value obtained by subtracting, from the pixel values of the internal image, a maximum integral number smaller than or equal to a value obtained by decreasing a bit depth of the pixel values of the internal image by the bit depth of the input image.

19. The method of claim 18, wherein the de-scaling method right-shifts, by the bit depth increment, a bit stream of a value obtained by subtracting, from the pixel values of the internal image, a maximum integral number smaller than or equal to a value obtained by right-shifting the bit stream of the pixel values of the internal image by the bit depth increment.

20. The method of claim 1, further comprising: encoding information about the bit depth increment and transmitting the encoded information with encoding data of a picture and encoding mode information about the coding units having the tree structure of the maximum coding unit.

21. A method of decoding a video based on a bit depth increment, the method comprising:
    parsing a received bit stream and extracting image data encoded for coding units, encoding mode information about the coding units having a tree structure, and information about the bit depth increment according to the coding units having the tree structure of a maximum coding unit from among maximum coding units split from a current image from the parsed bit stream;
    decoding the image data encoded for the coding units and restoring an internal image based on the extracted encoding mode information about the coding units having the tree structure for the maximum coding unit, wherein a coded depth of one coding unit in one region of the maximum coding unit is independent of a coded depth of another coding unit in another region of the maximum coding unit; and
    determining a de-scaling method corresponding to a scaling method that increases an initial bit depth of an original image, and generating a restored image by applying the de-scaling method to pixel values of the internal image and decreasing a bit depth of the internal image,
    wherein a dynamic range based on a bit depth of the restored image having a restored bit depth according to the de-scaling method is identical to an initial dynamic range based on the initial bit depth of the original image,
    wherein the dynamic range of the internal image is increased from the initial dynamic range by scaling the pixel values of the original image by the predetermined bit increment,
    wherein the predetermined bit increment is a fixed value based on a difference between the initial dynamic range and the dynamic range of the internal image,
    wherein the initial dynamic range of the input image is to be restored by compensating the dynamic range of the internal image using an error between a maximum dynamic range according to the increased bit depth and the dynamic range of the internal image and decreasing the compensated dynamic range by the increased bit depth,
    wherein the coded depth of the coding unit is equal to or below a predetermined maximum depth, and
    wherein the coded depth of one coding unit in one region of the maximum coding unit is determined based on split information.

22. The method of claim 21, wherein a first minimum value of the dynamic range based on the initial bit depth of the original image is 0, and a first maximum value of the initial dynamic range based on the initial bit depth of the original image is obtained by subtracting 1 from a value obtained by raising 2 to a power of the initial bit depth of the original image, and a second minimum value of the dynamic range of the internal image is 0, and a second maximum value of the dynamic range of the internal image is obtained by left-shifting a bit stream of the first maximum value by the bit increment according to the scaling method.

23. The method of claim 21, wherein a first minimum value of the dynamic range based on the bit depth of the original image is 0, and a first maximum value of the dynamic range based on the bit depth of the original image is obtained by subtracting 1 from a value obtained by raising 2 to a power of the bit depth of the original image, and a second minimum value of the dynamic range of the internal image is 0, and a second maximum value of the dynamic range of the internal image is obtained by subtracting 1 from a value obtained by raising 2 to a power of a sum of a bit depth increment according to the scaling method and the bit depth of the original image.

24. The method of claim 21, wherein a first minimum value of the dynamic range based on the bit depth of the original image is 0, and a first maximum value of the dynamic range based on the bit depth of the original image is obtained by subtracting 1 from a value obtained by raising 2 to a power of the bit depth of the original image, and a second minimum value of the dynamic range of the internal image is obtained by subtracting 1 from a value obtained by raising 2 to a power of the bit depth increment according to the scaling method, and a second maximum value of the dynamic range of the internal image is obtained by subtracting 1 from a value obtained by raising 2 to a power of a sum of a bit depth increment according to the scaling method and the bit depth of the original image.

25. The method of claim 22, wherein the de-scaling method right-shifts, by the bit increment, a bit stream of a value obtained by summing pixel values of the internal image and an error between the second maximum value and a maximum value of the maximum dynamic range increased based on a bit depth obtained by summing the bit depth of the original image and the bit increment.

26. The method of claim 25, wherein the error between the second maximum and the maximum value of the maximum dynamic range is a value obtained by left-shifting a bit stream of 1 by a value obtained by subtracting 1 from the bit increment.

27. The method of claim 25, wherein the scaling method corresponding to the de-scaling method left-shifts a bit stream of the pixel values of the original image by the bit increment.

28. The method of claim 23, wherein the de-scaling method multiplies the dynamic range of the original image by the pixel values of the internal image to output a first product and divides the first product by the dynamic range of the internal image.

29. The method of claim 28, wherein the de-scaling method divides, by the dynamic range of the internal image, a value obtained by subtracting pixel values of the internal image from a value obtained by left-shifting a bit stream of the pixel values of the internal image by the bit depth of the original image.

30. The method of claim 28, wherein the scaling method corresponding to the de-scaling method multiplies pixel values of the original image by the dynamic range of the internal image to output a second product and divides the second product by the dynamic range of the original image.

31. The method of claim 30, wherein the scaling method divides, by the dynamic range of the original image, a value obtained by subtracting the pixel values of the original image from a value obtained by left-shifting the bit stream of the pixel values of the original image by the sum of the bit depth increment and the bit depth of the original image.

32. The method of claim 24, wherein the de-scaling method decreases a bit depth of a value obtained by summing the pixel values of the internal image and 1 by the bit depth increment.

33. The method of claim 32, wherein the de-scaling method subtracts 1 from a value obtained by right-shifting, by the bit depth increment, a bit stream of the value obtained by summing the pixel values of the internal image and 1.

34. The method of claim 32, wherein the scaling method corresponding to the de-scaling method increases a bit depth of a value obtained by summing the pixel values of the original image and 1 by the bit increment.

35. The method of claim 34, wherein the scaling method subtracts 1 from a value obtained by left-shifting, by the bit depth increment, a bit stream of the value obtained by summing the pixel values of the original image and 1.

36. The method of claim 23, wherein the de-scaling method decreases, by the bit depth increment, a bit depth of a value obtained by subtracting, from the pixel values of the internal image, a maximum integral number smaller than or equal to a value obtained by decreasing a bit depth of the pixel values of the internal image by the bit depth of the original image.

37. The method of claim 36, wherein the de-scaling method right-shifts, by the bit depth increment, a bit stream of a value obtained by subtracting, from the pixel values of the internal image, a maximum integral number smaller than or equal to a value obtained by right-shifting the bit stream of the pixel values of the internal image by the bit depth increment.

38. The method of claim 36, wherein the scaling method corresponding to the de-scaling method sums a value obtained by increasing the bit depth of the original image by the bit depth increment and a maximum integral number smaller than or equal to a value obtained by decreasing the bit depth of the original image by a difference between the bit depth of the original image and the bit depth increment.

39. The method of claim 38, wherein the scaling method sums a value obtained by left-shifting the bit stream of pixel values of the original image by the bit depth increment and a maximum integral number smaller than or equal to a value obtained by right-shifting the bit stream of pixel values of the original image by the difference between the bit depth of the original image and the bit depth increment.

40. The method of claim 21, wherein the coding units having the tree structure included in the maximum coding unit are coding units of coding depths that are hierarchical in the maximum coding unit, a coded depth of one coding unit in one region being independent of a coded depth of another coding unit in another region, wherein the coding units of coding depths are coding units determined to independently output an encoding result for the coding units, of the coded depths indicating a number of times the maximum coding unit is split.

41. An apparatus for encoding a video based on a bit depth increment, the apparatus comprising:

a bit depth increment unit which determines a scaling method and a de-scaling method so that a restored dynamic range based on a bit depth of a restored image formed by de-scaling by the bit depth increment, is identical to a dynamic range based on an initial bit depth of an input image, so the scaling method increases the initial bit depth of the input image, and generates an internal image having the bit depth increased by a predetermined bit increment from the initial bit depth by applying the scaling method to pixel values of the input image;

an encoding unit which determines coding units having a tree structure of coding depths that are hierarchical in a maximum coding unit, a coded depth of one coding unit in one region of the maximum coding unit being independent of a coded depth of another coding unit in another region of the maximum coding unit, by independently determining the coding units of the coding depths to output an encoding result of the coding units of coded depths indicating a number of times the maximum coding unit is spatially split, the maximum coding unit being split into a data unit of a maximum size to encode the internal image generated by the bit depth increment; and a transmission unit which encodes information about the bit depth increment and transmits the encoded information with encoding data of a picture and encoding mode information about the coding units having the tree structure of the maximum coding unit, wherein a dynamic range of the internal image is increased from the initial dynamic range by scaling the pixel values of the input image by the predetermined bit increment, wherein the predetermined bit increment is a fixed value based on a difference between the initial dynamic range and the dynamic range of the internal image, wherein the initial dynamic range of the input image is to be restored by compensating the dynamic range of the internal image using an error between a maximum dynamic range according to the increased bit depth and the dynamic range of the internal image and decreasing the compensated dynamic range by the increased bit depth, wherein the coded depth of the coding unit is equal to or below a predetermined maximum depth, and wherein the coded depth of one coding unit in one region of the maximum coding unit is determined based on split information.

42. An apparatus for decoding a video based on a bit depth increment, the apparatus comprising:

a receiver and extractor which parses a received bit stream and extracts image data encoded for coding units, encodes mode information about the coding units having a tree structure, and information about the bit depth increment according to the coding units having the tree structure of a maximum coding unit from among maximum coding units split from a current image from the parsed bit stream;

a decoding unit which decodes the image data encoded for the coding units and restores an internal image based on the extracted encoding mode information about the coding units having the tree structure for the maximum coding unit, wherein a coded depth of one coding unit in one region of the maximum coding unit is independent of a coded depth of another coding unit in another region of the maximum coding unit; and a bit depth restoring unit which determines a de-scaling method corresponding to a scaling method that increases an initial bit depth of an original image, and generates a restored image by applying the de-scaling method to pixel values of the internal image and decreasing a bit depth of the internal image, wherein a dynamic range based on a bit depth of the restored image having a restored bit depth according to the de-scaling method is identical to an initial dynamic range based on the initial bit depth of the original image, wherein the dynamic range of the internal image is increased from the initial dynamic range by scaling the pixel values of the original image by the predetermined bit increment, wherein the predetermined bit increment is a fixed value based on a difference between the initial dynamic range and the dynamic range of the internal image, wherein the initial dynamic range of the input image is to be restored by compensating the dynamic range of the internal image using an error between a maximum dynamic range according to the increased bit depth and the dynamic range of the internal image and decreasing the compensated dynamic range by the increased bit depth, wherein the coded depth of the coding unit is equal to or below a predetermined maximum depth, and wherein the coded depth of one coding unit in one region of the maximum coding unit is determined based on split information.

43. A non-transitory computer readable recording medium having recorded thereon a program for executing the method of claim 1.

44. A non-transitory computer readable recording medium having recorded thereon a program for executing the method of claim 21.

\* \* \* \* \*